United States Patent
Ito et al.

(10) Patent No.: US 7,719,665 B2
(45) Date of Patent: May 18, 2010

(54) METHOD, APPARATUS, AND PROGRAM FOR MEASURING WAVELENGTH DISPERSION OF OPTICAL WAVEGUIDE

(75) Inventors: Fumihiko Ito, Tokyo (JP); Keiji Okamoto, Ibaraki (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 742 days.

(21) Appl. No.: 11/574,806

(22) PCT Filed: Sep. 13, 2006

(86) PCT No.: PCT/JP2006/318180

§ 371 (c)(1),
(2), (4) Date: Mar. 6, 2007

(87) PCT Pub. No.: WO2007/034721

PCT Pub. Date: Mar. 29, 2007

(65) Prior Publication Data

US 2009/0231591 A1    Sep. 17, 2009

(30) Foreign Application Priority Data

Sep. 22, 2005 (JP) .............................. 2005-276372
Jan. 23, 2006 (JP) .............................. 2006-013796
Feb. 24, 2006 (JP) .............................. 2006-048759

(51) Int. Cl.
*G01N 21/00* (2006.01)
(52) U.S. Cl. .................................................. 356/73.1
(58) Field of Classification Search ........................ None
See application file for complete search history.

(56) References Cited

U.S. PATENT DOCUMENTS 5,790,294 A * 8/1998 Horiuchi et al. ............... 398/37
6,643,603 B2 * 11/2003 Aoki et al. ................... 702/127
7,003,202 B2 * 2/2006 Tadakuma et al. ........... 385/122

FOREIGN PATENT DOCUMENTS

JP        07-243943        9/1995
JP        2000-193557      7/2000
JP        2005-156339      6/2005

OTHER PUBLICATIONS

L. F. Mollenauer, et al., "Method for facile and accurate measurement of optical fiber dispenser maps", Optics Letters, vol. 21, No. 21, Nov. 1, 1996, pp. 1724-1726.
E. Brinkmeyer et al., "High-Resolution OCDR in Dispersive Waveguides", Electronics Letters, vol. 26, No. 6, pp. 413-414 (15th Mar. 1990).

* cited by examiner

*Primary Examiner*—Tu T Nguyen
(74) *Attorney, Agent, or Firm*—Hogan & Hartson LLP

(57) ABSTRACT

The invention is to provide a wavelength dispersion measuring method for an optical fiber capable of measuring a wavelength dispersion in a section extending from an incident end of the optical fiber to an arbitrary point along the way by using a scattering phenomenon in which a scattering coefficient at a local point on the optical fiber is independent of time. Incident light having a known spectral density function $S(\omega)$ is caused to be incident on the optical waveguide, and a wavelength dispersion of the section extending from the incident end of the optical waveguide to the arbitrary point along the way by a correlational function between a signal being proportional to a scattered light amplitude generated at a first halfway point and a signal being proportional to a scattered light amplitude generated at a second halfway point.

24 Claims, 8 Drawing Sheets

US 7,719,665 B2

METHOD, APPARATUS, AND PROGRAM FOR MEASURING WAVELENGTH DISPERSION OF OPTICAL WAVEGUIDE

CROSS-REFERENCE TO THE RELATED APPLICATIONS

This application is a national phase of the international application No. PCT/JP2006/318180 filed Sep. 13, 2006, the entire contents of which are incorporated by reference. This application also claims benefit of priority under 35 U.S.C. §119 to Japanese Patent Application No. 2005-276372 filed Sep. 22, 2005, Japanese Patent Application No. 2006-013796 filed Jan. 23, 2006 and Japanese Patent Application No. 2006-048759 filed Feb. 24, 2006, the entire contents of all of which are incorporated by reference.

TECHNICAL FIELD

The present invention relates to a method, an apparatus, and a program for measuring wavelength dispersion on an optical waveguide.

BACKGROUND FIELD

Since an optical communication system using an optical fiber serving as one of optical waveguides, wavelength dispersion of the optical fiber considerably affects the characteristics of the optical communication system to distort a signal waveform in propagation of an optical signal, it is indispensable in design of the communication system that wavelength dispersion of the optical fiber or the like is known by measurement. In particular, in an actual operation or a test of a system, when an optical cable is installed, distribution of optical fibers in a direction of length of wavelength dispersion must be often measured. In this manner, as a method of non-destructively measuring a distribution of optical fibers in the direction of length of wavelength dispersion, a conventional method of using optical four-wave mixing in optical fibers is given (for example, see Non-patent Document 1).

Non-patent Document 1: L. F. Mollenauer et al. "Method for facile and accurate measurement of optical fiber dispersion maps, "OPTICS LETTERS, VOL. 21, NO. 21, Nov. 1, 1996, pp. 1724-1726

Non-patent Document 2: E. Brinkmeyer and R. Ulrich, "High-resolution OCDR in dispersive waveguides, "Electronics Letters, vol. 26, No. 6, pp. 413-414 (15 Mar. 1990)

DISCLOSURE OF THE INVENTION

Problem to be Solved by the Invention

However, since the conventional method must use a nonlinear optical effect in an optical fiber, the method has a disadvantage of requiring a laser beam having a high intensity (in Non-patent Document 1, a measuring system is constructed by a laser beam having about 1 W). For this reason, the present invention provides a new method of non-destructively measuring a distribution of optical waveguides in a direction of length of wavelength dispersion by a method having an essential principle different from that of the conventional method. It is an object to provide a method, an apparatus, and a program for measuring waveguide dispersion without requiring a high-output light source unlike in the conventional technique.

Means for Solving the Problem

The present invention is a wavelength dispersion measuring method for an optical waveguide capable of measuring a wavelength dispersion in a section extending from an incident end of the optical waveguide to an arbitrary point along the way by using a scattering phenomenon in which a scattering coefficient at a local point on the optical waveguide is independent of time, including: a step of causing incident light having a known spectral density function $S(\omega)$ to be incident on the optical waveguide; a step of observing, by the incident light being incident on the optical waveguide in the step of causing the incident light to be incident on the optical waveguide, a signal being proportional to a scattered light amplitude generated at a first halfway point included in the section extending from the incident end of the optical waveguide to the arbitrary point along the way and a signal being proportional to a scattered light amplitude generated at a second halfway point being different from the first halfway point and included in the section extending from the incident end of the optical waveguide to the arbitrary point along the way; and a step of calculating a wavelength dispersion of the section extending from the incident end of the optical waveguide to the arbitrary point along the way by a correlational function between the signal being proportional to the scattered light amplitude at the first halfway point and the signal being proportional to the scattered light amplitude at the second halfway point, the signals being observed in the step of observing the signals which are proportional to the scattered light amplitudes.

In the wavelength dispersion measuring method, the step of observing the signals being proportional to the scattered light amplitudes is desirably the step of observing of Rayleigh-scattered lights as the scattered lights at the first halfway point and the second halfway point.

In the wavelength dispersion measuring method, the step of observing the signals being proportional to the scattered light amplitudes is desirably the step of guiding scattered light generated by incident light being incident on the optical waveguide and incident light passing through delay means having delay time equal to propagation time corresponding to twice a length between the incident end of the optical waveguide and the first halfway point to first interference signal detecting means and second interference signal detecting means which have a relative delay difference equal to a distance between the first halfway point and the second halfway point to detect an interference signal $I_1$ being proportional to a scattered light amplitude from the first halfway point and an interference signal $I_2$ being proportional to a scattered light amplitude from the second halfway point, and the step of calculating the wavelength dispersion is desirably the step of calculating a wavelength dispersion of the section extending from the incident end of the optical waveguide to the arbitrary point along the way by a correlational function between the interference signal $I_1$ and the interference signal $I_2$.

In the wavelength dispersion measuring method, variable delay means set on a path of the scattered light or the incident light is arranged, the step of observing the signals being proportional to the scattered light amplitudes is desirably the step of respectively detecting the plurality of interference signals $I_1$ and $I_2$ while causing the variable delay means to change quantity of delay, and the step of calculating the wavelength dispersion is desirably the step of calculating a correlational function between the interference signals $I_1$ and $I_2$ by calculating the following numerical expression (40) expressing an ensemble average of products of the interference signals $I_1$ and $I_2$ detected in the step of observing the signals being proportional to the scattered light amplitudes:

$$\overline{I_1 I_2^*} \qquad \text{[Numerical Expression 40]}$$

In the wavelength dispersion measuring method, variable delay means set on a path of the scattered light or the incident light is arranged, the step of observing the signals being proportional to the scattered light amplitudes is desirably the step of detecting the interference signals $I_1$ and $I_2$ as interference signals I while causing the variable delay means to continuously change delay time $\tau$, and the step of calculating the wavelength dispersion is desirably the step of recording the interference signals I detected in the step of observing the signals being proportional to the scattered light amplitudes as a function $I(\tau)$ of $\tau$ and calculating a correlational function between the interference signal $I_1$ being proportional to a scattered light amplitude from the first halfway point and the interference signal $I_2$ being proportional to a scattered light amplitude from the second halfway point by calculating the following numerical expression (42) expressing an ensemble average of the interference signals $I_1$ and $I_2$:

$$\overline{I_1 I_2^*} \qquad \text{[Numerical Expression 42]}$$

by the following numerical expression (41):

$$\overline{I_1 I_2^*} = \langle I(\tau_i) I(\tau_i + d/c) \rangle_i \qquad \text{[Numerical Expression 41]}$$

(where $\langle \; \rangle_i$ expresses an averaging operation about $\tau_i$) by using the function $I(\tau)$.

In the wavelength dispersion measuring method, by using the following numerical expression (43) calculated as the correlational function of the interference signals $I_1$ and $I_2$:

$$\overline{I_1 I_2^*} \qquad \text{[Numerical Expression 43]}$$

a dispersion D in the section extending from the incident end of the optical waveguide to the arbitrary point along the way is desirably calculated by the following numerical expression (44):

$$\frac{\overline{I_1 I_2^*}}{|I_1|^2} = \frac{\overline{I_1 I_2^*}}{|I_2|^2} \qquad \text{[Numerical Expression 44]}$$

$$= \frac{\int_{-\infty}^{\infty} \Gamma(Z) \Gamma^*(Z-d) dZ}{\int_{-\infty}^{\infty} |\Gamma(Z)|^2 dZ}$$

where, $$\Gamma(z) \cong \exp\left[i \frac{\omega_0}{v_p} z\right] \cdot \int_{-\infty}^{\infty} S(\omega) \exp \left\{ i \left[ \frac{\beta'' z_0}{2}(\omega - \omega_0)^2 - \frac{\omega - \omega_0}{v_g} z \right] \right\} d\omega$$

$$D = -\frac{2\pi c}{\lambda^2} \beta''$$

$S(\omega)$: spectral density function of known incident light
d: relative delay difference between first and second interference signal detecting means
$\omega_0$: central frequency of incident light
$v_g$: group velocity of optical waveguide (can be calculated from refractive index or the like of optical waveguide)
$z_0$: length of section extending from incident end of the optical waveguide to arbitrary point along the way
$\lambda$: central wavelength of incident light $|I_1|^2 \cdot |I_2|^2$: squares of absolute values of $I_1$ and $I_2$.

The present invention is a wavelength dispersion measuring apparatus for an optical waveguide capable of measuring a wavelength dispersion in a section extending from an incident end of the optical waveguide to an arbitrary point along the way by using a scattering phenomenon in which a scattering coefficient at a local point on the optical waveguide is independent of time, including: means for causing incident light having a known spectral density function $S(\omega)$ to be incident on the optical waveguide; means for observing, by the incident light from the means for causing the incident light on the optical waveguide, a signal being proportional to a scattered light amplitude generated at a first halfway point included in the section extending from the incident end of the optical waveguide to the arbitrary point along the way and a signal being proportional to a scattered light amplitude generated at a second halfway point being different from the first halfway point and included in the section extending from the incident end of the optical waveguide to the arbitrary point along the way; and means for calculating a wavelength dispersion of the section extending from the incident end of the optical waveguide to the arbitrary point along the way by a correlational function between the signal being proportional to the scattered light amplitude at the first halfway point and the signal being proportional to the scattered light amplitude at the second halfway point, the signals being observed by the means for observing the signals which are proportional to the scattered light amplitudes.

In the wavelength dispersion measuring apparatus, the means for observing the signals being proportional to the scattered light amplitudes desirably observes Rayleigh-scattered lights as the scattered lights at the first halfway point and the second halfway point.

In the wavelength dispersion measuring apparatus, the means for observing the signals being proportional to the scattered light amplitudes desirably guides scattered light generated by incident light being incident on the optical waveguide and incident light passing through delay means having delay time equal to propagation time corresponding to twice a length between the incident end of the optical waveguide and the first halfway point to first interference signal detecting means and second interference signal detecting means which have a relative delay difference equal to a distance between the first halfway point and the second halfway point to detect an interference signal $I_1$ being proportional to a scattered light amplitude from the first halfway point and an interference signal $I_2$ being proportional to a scattered light amplitude from the second halfway point, and the means for calculating the wavelength dispersion desirably calculates a wavelength dispersion of the section extending from the incident end of the optical waveguide to the arbitrary point along the way by a correlational function between the interference signal $I_1$ and the interference signal $I_2$ detected by the means for observing the signals being proportional to the scattered light amplitudes.

In the wavelength dispersion measuring apparatus, variable delay means set on a path of the scattered light or the incident light is arranged, the means for observing the signals being proportional to the scattered light amplitudes desirably respectively detects the plurality of interference signals $I_1$ and $I_2$ while causing the variable delay means to change quantity of delay, and the means for calculating the wavelength dispersion desirably calculates a correlational function between the interference signals $I_1$ and $I_2$ by calculating the following numerical expression (45) expressing an ensemble average of products of the interference signals $I_1$ and $I_2$ detected by the means for observing the signals being proportional to the scattered light amplitudes:

$$\overline{I_1 I_2^*}$$ [Numerical Expression 45]

In the wavelength dispersion measuring apparatus, variable delay means set on a path of the scattered light or the incident light is arranged, the means for observing the signals being proportional to the scattered light amplitudes desirably detects the interference signals $I_1$ and $I_2$ as interference signals I while continuously change delay time $\tau$ of the variable delay means, and the means for calculating the wavelength dispersion desirably records the interference signals I as a function $I(\tau)$ of $\tau$ and calculates a correlational function between the interference signal $I_1$ being proportional to a scattered light amplitude from the first halfway point and the interference signal $I_2$ being proportional to a scattered light amplitude from the second halfway point by calculating the following numerical expression (47) expressing an ensemble average of the interference signals $I_1$ and $I_2$:

$$\overline{I_1 I_2^*}$$ [Numerical Expression 47]

by the following numerical expression (46):

$$\overline{I_1 I_2^*} = \langle I(\tau_i) I(\tau_i + d/c) \rangle_i$$ [Numerical Expression 46]

(where $< >_i$ expresses an averaging operation about $\tau i$) by using the function $I(\tau)$.

In the wavelength dispersion measuring apparatus, by using the following numerical expression (48) calculated as the correlational function of the interference signals $I_1$ and $I_2$:

$$\overline{I_1 I_2^*}$$ [Numerical Expression 48]

a dispersion D in the section extending from the incident end of the optical waveguide to the arbitrary point along the way is desirably calculated by the following numerical expression (49):

$$\frac{\overline{I_1 I_2^*}}{|I_1|^2} = \frac{\overline{I_1 I_2^*}}{|I_2|^2}$$ [Numerical Expression 49]

$$= \frac{\int_{-\infty}^{\infty} \Gamma(Z) \Gamma^*(Z-d) dZ}{\int_{-\infty}^{\infty} |\Gamma(Z)|^2 dZ}$$

where, $$\Gamma(z) \cong \exp\left[i\frac{\omega_0}{v_p}z\right] \cdot \int_{-\infty}^{\infty} S(\omega) \exp\left\{i\left[\frac{\beta'' z_0}{2}(\omega - \omega_0)^2 - \frac{\omega - \omega_0}{v_g}z\right]\right\} d\omega$$

$$D = -\frac{2\pi c}{\lambda^2} \beta''$$

$S(\omega)$: spectral density function of known incident light
d: relative delay difference between first and second interference signal detecting means
$\omega_0$: central frequency of incident light
$v_g$: group velocity of optical waveguide (can be calculated from refractive index or the like of optical waveguide)
$z_0$: length of section extending from incident end of the optical waveguide to arbitrary point on the way
$\lambda$: central wavelength of incident light
$|I_1|^2$, $|I_2|^2$: squares of absolute values of $I_1$ and $I_2$ The present invention is a wavelength dispersion measuring method for an optical waveguide capable of measuring a wavelength dispersion in a section extending from an incident end of the optical waveguide to an arbitrary point along the way by using a scattering phenomenon in which a scattering coefficient at a local point on the optical waveguide is independent of time, including: a step of causing incident light having a known spectral density function $S(\omega)$ to be incident on the optical waveguide; a step of observing, by the incident light being incident on the optical waveguide in the step of causing the incident light to be incident on the optical waveguide, a signal being proportional to a scattered light amplitude generated at a first halfway point included in the section extending from the incident end of the optical waveguide to the arbitrary point along the way and a signal being proportional to a scattered light amplitude generated at a second halfway point being different from the first halfway point and included in the section extending from the incident end of the optical waveguide to the arbitrary point along the way; and a step of calculating a wavelength dispersion of the section extending from the incident end of the optical waveguide to the arbitrary point along the way by square of correlational function between the signal being proportional to the scattered light amplitude at the first halfway point and the signal being proportional to the scattered light amplitude at the second halfway point, the signals being observed in the step of observing the signals which are proportional to the scattered light amplitudes.

In the wavelength dispersion measuring method, the step of observing the signals being proportional to the scattered light amplitudes is desirably the step of guiding scattered light generated by incident light being incident on the optical waveguide and incident light passing through delay means having delay time equal to propagation time corresponding to twice a length between the incident end of the optical waveguide and the first halfway point to first interference signal detecting means and second interference signal detecting means which have a relative delay difference equal to a distance between the first halfway point and the second halfway point to detect an interference signal $I_1$ being proportional to a scattered light amplitude from the first halfway point and an interference signal $I_2$ being proportional to a scattered light amplitude from the second halfway point, and the step of calculating the wavelength dispersion is desirably the step of calculating a wavelength dispersion of the section extending from the incident end of the optical waveguide to the arbitrary point along the way by a correlational function between squares $|I_1|^2$ and $|I_2|^2$ of absolute values of the interference signals $I_1$ and $I_2$.

In the wavelength dispersion measuring method, variable delay means set on a path of the scattered light or the incident light is further arranged, the step of observing the signals being proportional to the scattered light amplitudes is desirably the step of detecting the interference signals $I_1$ and $I_2$ as interference signals I while continuously changing delay time $\tau$ of the variable delay means, and the step of calculating the wavelength dispersion is desirably the step of recording the interference signals I as a function $I(\tau)$ of $\tau$ and calculating square of correlational function between the interference signal $I_1$ being proportional to a scattered light amplitude from the first halfway point and the interference signal $I_2$ being proportional to a scattered light amplitude from the second halfway point by using the function $I(\tau)$.

In the wavelength dispersion measuring method, the correlational function of the squares of the absolute values of the interference signals $I_1$ and $I_2$ are calculated to calculate a dispersion D in the section extending from the incident end of the optical waveguide to the arbitrary point along the way by the following numerical expression (50):

$$\overline{(|I_1|^2 - \overline{|I|^2})(|I_2|^2 - \overline{|I|^2})} = \overline{|I_1|^2|I_2|^2} - \overline{|I|^2}$$ [Numerical Expression 50]

$$= K \left\{ \int_{-\infty}^{\infty} \begin{array}{c} |\Gamma(z)| \cdot \\ |\Gamma(z-d)| \end{array} dz \right\}^2$$

where, $$\Gamma(z) \cong$$

$$\int_{-\infty}^{\infty} S(\omega) \exp\left\{ i \left[ \frac{\beta'' z_0}{2}(\omega - \omega_0)^2 - \frac{\omega - \omega_0}{v_g} z \right] \right\} d\omega$$

$$D = -\frac{2\pi c}{\lambda^2} \beta''$$

$S(\omega)$: spectral density function of known incident light
d: relative delay difference between first and second interference signal detecting means
$\omega_0$: central frequency of incident light
$v_g$: group velocity of optical waveguide (can be calculated from refractive index or the like of optical waveguide)
$z_0$: length of section extending from incident end of the optical waveguide to arbitrary point along the way
$\lambda$: central wavelength of incident light
K: constant
$|I_1|^2$, $|I_2|^2$: squares of absolute values of $I_1$ and $I_2$.

$\overline{|I|^2}$: average of $|I_1|^2$ and $|I_2|^2$ [Numerical Expression 51]

The present invention is a wavelength dispersion measuring apparatus for an optical waveguide capable of measuring a wavelength dispersion in a section extending from an incident end of the optical waveguide to an arbitrary point along the way by using a scattering phenomenon in which a scattering coefficient at a local point on the optical waveguide is independent of time, including: means for causing incident light having a known spectral density function $S(\omega)$ to be incident on the optical waveguide; means for observing, by the incident light from the means for causing the incident light on the optical waveguide, a signal being proportional to a scattered light amplitude generated at a first halfway point included in the section extending from the incident end of the optical waveguide to the arbitrary point along the way and a signal being proportional to a scattered light amplitude generated at a second halfway point being different from the first halfway point and included in the section extending from the incident end of the optical waveguide to the arbitrary point along the way; and means for calculating a wavelength dispersion of the section extending from the incident end of the optical waveguide to the arbitrary point along the way by square of correlational function between the signal being proportional to the scattered light amplitude at the first halfway point and the signal being proportional to the scattered light amplitude at the second halfway point, the signals being observed by the means for observing the signals which are proportional to the scattered light amplitudes.

In the wavelength dispersion measuring apparatus, the means for observing the signals being proportional to the scattered light amplitudes desirably guides scattered light generated by incident light being incident on the optical waveguide and incident light passing through delay means having delay time equal to propagation time corresponding to twice a length between the incident end of the optical waveguide and the first halfway point to first interference signal detecting means and second interference signal detecting means which have a relative delay difference equal to a distance between the first halfway point and the second halfway point to detect an interference signal $I_1$ being proportional to a scattered light amplitude from the first halfway point and an interference signal $I_2$ being proportional to a scattered light amplitude from the second halfway point, and the means for calculating the wavelength dispersion desirably measuring a wavelength dispersion of the section extending from the incident end of the optical waveguide to the arbitrary point along the way by a correlational function between squares $|I_1|^2$ and $|I_2|^2$ of absolute values of the interference signals $I_1$ and $I_2$ detected by the means for observing the signals being proportional to the scattered light amplitudes.

In the wavelength dispersion measuring apparatus, variable delay means set on a path of the scattered light or the incident light is further arranged, the means for observing the signals being proportional to the scattered light amplitudes desirably detects the interference signals $I_1$ and $I_2$ as interference signals I while continuously changing delay time $\tau$ of the variable delay means, and the means for calculating the wavelength dispersion desirably records the interference signals I as a function $I(\tau)$ of $\tau$ and calculates square of correlational function between the interference signal $I_1$ being proportional to a scattered light amplitude from the first halfway point and the interference signal $I_2$ being proportional to a scattered light amplitude from the second halfway point by using the function $I(\tau)$.

In the wavelength dispersion measuring apparatus, the means for calculating the wavelength dispersion desirably calculates the correlational function of the squares of the absolute values of the interference signals $I_1$ and $I_2$ to calculate a dispersion D in the section extending from the incident end of the optical waveguide to the arbitrary point along the way by the following numerical expression (52):

$$\overline{(|I_1|^2 - \overline{|I|^2})(|I_2|^2 - \overline{|I|^2})} = \overline{|I_1|^2|I_2|^2} - \overline{|I|^2}$$ [Numerical Expression 52]

$$= K \left\{ \int_{-\infty}^{\infty} \begin{array}{c} |\Gamma(z)| \cdot \\ |\Gamma(z-d)| \end{array} dz \right\}^2$$

where, $$\Gamma(z) \cong$$

$$\int_{-\infty}^{\infty} S(\omega) \exp\left\{ i \left[ \frac{\beta'' z_0}{2}(\omega - \omega_0)^2 - \frac{\omega - \omega_0}{v_g} z \right] \right\} d\omega$$

$$D = -\frac{2\pi c}{\lambda^2} \beta''$$

$S(\omega)$: spectral density function of known incident light
d: relative delay difference between first and second interference signal detecting means
$\omega_0$: central frequency of incident light $v_g$: group velocity of optical waveguide (can be calculated from refractive index or the like of optical waveguide)

$z_0$: length of section extending from incident end of the optical waveguide to arbitrary point along the way $\lambda$: central wavelength of incident light K: constant $|I_1|^2, |I_2|^2$: squares of absolute values of $I_1$ and $I_2$.

$$\overline{|I|^2}: \text{average of } |I_1|^2 \text{ and } |I_2|^2 \quad \text{[Numerical Expression 53]}$$

The present invention is a measuring program used in a wavelength dispersion measuring apparatus for an optical waveguide capable of measuring a wavelength dispersion in a section extending from an incident end of the optical waveguide to an arbitrary point along the way by using a scattering phenomenon in which a scattering coefficient at a local point on the optical waveguide is independent of time, wherein an interference signal $I_1$ being proportional to a scattered light amplitude generated by incident light being incident on the optical waveguide at a first halfway point included in the section extending from the incident end of the optical waveguide to the arbitrary point along the way and an interference signal $I_2$ being proportional to a scattered light amplitude generated by the incident light being incident on the optical waveguide at a second halfway point different from the first halfway point and included in the section extending from the incident end of the optical waveguide to the arbitrary point along the way are received as numerical values, and the correlational function of the squares of the absolute values of the interference signals $I_1$ and $I_2$ to calculate a wavelength dispersion D in the section extending from the incident end of the optical waveguide to the arbitrary point along the way by the following numerical expression (54):

$$\overline{(|I_1|^2 - \overline{|I|^2})(|I_2|^2 - \overline{|I|^2})} = \overline{|I_1|^2|I_2|^2} - \overline{|I|^2} \quad \text{[Numerical Expression 54]}$$

$$= K \left\{ \int_{-\infty}^{\infty} |\Gamma(z)| \cdot |\Gamma(z-d)| dz \right\}^2$$

where, $$\Gamma(z) \cong \int_{-\infty}^{\infty} S(\omega) \exp\left\{ i\left[ \frac{\beta'' z_0}{2}(\omega - \omega_0)^2 - \frac{\omega - \omega_0}{v_g} z \right] \right\} d\omega$$

$$D = -\frac{2\pi c}{\lambda^2} \beta''$$

$S(\omega)$: spectral density function of known incident light d: relative delay difference between first and second interference signal detecting means $\omega_0$: central frequency of incident light $v_g$: group velocity of optical waveguide (can be calculated from refractive index or the like of optical waveguide)

$z_0$: length of section extending from incident end of the optical waveguide to arbitrary point along the way $\lambda$: central wavelength of incident light K: constant $|I_1|^2, |I_2|^2$: squares of absolute values of $I_1$ and $I_2$.

$$\overline{|I|^2}: \text{average of } |I_1|^2 \text{ and } |I_2|^2 \quad \text{[Numerical Expression 55]}$$

The present invention is a measuring program used in a wavelength dispersion measuring apparatus for an optical waveguide capable of measuring a wavelength dispersion in a section extending from an incident end of the optical waveguide to an arbitrary point along the way by using a scattering phenomenon in which a scattering coefficient at a local point on the optical waveguide is independent of time, wherein an interference signal $I_1$ being proportional to a scattered light amplitude generated by incident light being incident on the optical waveguide at a first halfway point included in the section extending from the incident end of the optical waveguide to the arbitrary point along the way and an interference signal $I_2$ being proportional to a scattered light amplitude generated by the incident light being incident on the optical waveguide at a second halfway point different from the first halfway point and included in the section extending from the incident end of the optical waveguide to the arbitrary point along the way are received as numerical values, and the correlational function of the interference signals $I_1$ and $I_2$ is calculated to calculate a wavelength dispersion D in the section extending from the incident end of the optical waveguide to the arbitrary point along the way by the following numerical expression (56):

$$\frac{\overline{I_1 I_2}}{\overline{|I_1|^2}} = \frac{\overline{I_1 I_2}}{\overline{|I_2|^2}} \quad \text{[Numerical Expression 56]}$$

$$= \frac{\int_{-\infty}^{\infty} \Gamma(Z) \Gamma^*(Z-d) dZ}{\int_{-\infty}^{\infty} |\Gamma(Z)|^2 dZ}$$

where, $$\Gamma(z) \cong \exp\left[ i\frac{\omega_0}{v_p} z \right] \cdot \int_{-\infty}^{\infty} S(\omega) \exp$$

$$\left\{ i\left[ \frac{\beta'' z_0}{2}(\omega - \omega_0)^2 - \frac{\omega - \omega_0}{v_g} z \right] \right\} d\omega$$

$$D = -\frac{2\pi c}{\lambda^2} \beta''$$

$S(\omega)$: spectral density function of known incident light d: relative delay difference between first and second interference signal detecting means $\omega_0$: central frequency of incident light $v_g$: group velocity of optical waveguide (can be calculated from refractive index or the like of optical waveguide)

$z_0$: length of section extending from incident end of the optical waveguide to arbitrary point along the way $\lambda$: central wavelength of incident light $|I_1|^2, |I_2|^2$: squares of absolute values of $I_1$ and $I_2$.

The present invention is a method capable of measuring a wavelength dispersion of a section extending from an incident end of an optical waveguide to an arbitrary point along the way by using a scattering phenomenon in which a scattering coefficient at a local point on the optical waveguide is independent of time, including: a step of causing incident light having a known spectral density function $S(\omega)$ to be incident on the optical waveguide; a step of observing, by the incident light being incident on the optical waveguide in the step of causing the incident light to be incident on the optical waveguide, a signal being proportional to a scattered light amplitude generated at a first halfway point included in the section extending from the incident end of the optical waveguide to the arbitrary point along the way and a signal being proportional to a scattered light amplitude generated at a second halfway point being different from the first halfway point and included in the section extending from the incident end of the optical waveguide to the arbitrary point along the way; and a step of calculating a wavelength dispersion of the section extending from the incident end of the optical waveguide to the arbitrary point along the way by square of correlational function between the signal being proportional to the scattered light amplitude at the first halfway point and the signal being proportional to the scattered light amplitude at the second halfway point, the signals being observed in the step of observing the signals which are proportional to the scattered light amplitudes, wherein the step of observing the signals being proportional to the scattered light amplitudes is desirably the step of, when scattered light generated by incident light being incident on the optical waveguide and incident light passing through delay means having delay time equal to propagation time corresponding to twice a length between the incident end of the optical waveguide and the first halfway point are guided to first interference signal detecting means and second interference signal detecting means which have a relative delay difference equal to a distance between the first halfway point and the second halfway point to detect an interference signal $I_1$ being proportional to a scattered light amplitude from the first halfway point and an interference signal $I_2$ being proportional to a scattered light amplitude from the second halfway point, detecting the interference signals $I_1$ and $I_2$ through a dispersion medium which is inserted on a path on which the scattered lights from the first halfway point and the second halfway point are guided to the first interference signal detecting means and the second interference signal detecting means or a path on which the incident light is guided to the first interference signal detecting means and the second interference signal detecting means in advance and in which a value of the following numerical expression (57):

$$\beta_{ref}'' L_{ref} \qquad \text{[Numerical Expression 57]}$$

expressing an accumulated wavelength dispersion is known, and the step of calculating the wavelength dispersion is desirably the step of calculating a correlational function between squares of absolute values of the interference signals $I_1$ and $I_2$ to calculate a dispersion D in the section extending from the incident end of the optical waveguides to the arbitrary point along the way by the following Numerical Expression (58):

$$\overline{(|I_1|^2 - \overline{|I|^2})(|I_2|^2 - \overline{|I|^2})} = \overline{|I_1|^2 |I_2|^2} - \overline{|I|^2}$$

$$= K \left\{ \int_{-\infty}^{\infty} |\Gamma(z)| \cdot |\Gamma(z-d)| dz \right\}^2$$

[Numerical Expression 58]

where, $$\Gamma(z) \cong \int_{-\infty}^{\infty} S(\omega) \exp \left\{ i \left[ \frac{\beta'' z_0 - \beta_{ref}'' L_{ref}}{2} (\omega - \omega_0)^2 - \frac{\omega - \omega_0}{v_g} z \right] \right\} d\omega$$

$$D = -\frac{2\pi c}{\lambda^2} \beta''$$

$S(\omega)$: spectral density function of known incident light
$d$: relative delay difference between first and second interference signal detecting means
$\omega_0$: central frequency of incident light
$v_g$: group velocity of optical waveguide (can be calculated from refractive index or the like of optical waveguide)
$z_0$: length of section extending from incident end of the optical waveguide to arbitrary point along the way
$\lambda$: central wavelength of incident light
K: constant
$|I_1|^2$, $|I_2|^2$: squares of absolute values of $I_1$ and $I_2$.

$$\overline{|I|^2}: \text{average of } |I_1|^2 \text{ and } |I_2|^2 \qquad \text{[Numerical Expression 59]}$$

The present invention is a wavelength dispersion measuring apparatus for an optical waveguide capable of measuring a wavelength dispersion of a section extending from an incident end of the optical waveguide to an arbitrary point along the way by using a scattering phenomenon in which a scattering coefficient at a local point on the optical waveguide is independent of time, including: means for causing incident light having a known spectral density function $S(\omega)$ to be incident on the optical waveguide; means for observing, by the incident light from the means for causing the incident light to be incident on the optical waveguide, a signal being proportional to a scattered light amplitude generated at a first halfway point included in the section extending from the incident end of the optical waveguide to the arbitrary point along the way and a signal being proportional to a scattered light amplitude generated at a second halfway point being different from the first halfway point and included in the section extending from the incident end of the optical waveguide to the arbitrary point along the way; and means for calculating a wavelength dispersion of the section extending from the incident end of the optical waveguide to the arbitrary point along the way by square of correlational function between the signal being proportional to the scattered light amplitude at the first halfway point and the signal being proportional to the scattered light amplitude at the second halfway point, the signals being observed in the means of observing the signals which are proportional to the scattered light amplitudes, wherein the means for observing the signals being proportional to the scattered light amplitudes desirably detects, when scattered light generated by incident light being incident on the optical waveguide and incident light passing through delay means having delay time equal to propagation time corresponding to twice a length between the incident end of the optical waveguide and the first halfway point are guided to first interference signal detecting means and second interference signal detecting means which have a relative delay difference equal to a distance between the first halfway point and the second halfway point to detect an interference signal $I_1$ being proportional to a scattered light amplitude from the first halfway point and an interference signal $I_2$ being proportional to a scattered light amplitude from the second halfway point, the interference signals $I_1$ and $I_2$ through a dispersion medium which is inserted on a path on which the scattered lights from the first halfway point and the second halfway point are guided to the first interference signal detecting means and the second interference signal detecting means or a path on which the incident light is guided to the first interference signal detecting means and the second interference signal detecting means in advance and in which a value of the following Numerical Expression (60):

$$\beta_{ref}'' L_{ref} \qquad \text{[Numerical Expression 60]}$$

expressing an accumulated wavelength dispersion is known, and the means for calculating the wavelength dispersion desirably calculates a correlational function between squares of absolute values of the interference signals $I_1$ and $I_2$ to calculate a dispersion D in the section extending from the incident end of the optical waveguides to the arbitrary point along the way by the following Numerical Expression (61):

$$\overline{(|I_1|^2 - \overline{|I|^2})(|I_2|^2 - \overline{|I|^2})} = \overline{|I_1|^2 |I_2|^2} - \overline{|I|^2}$$

[Numerical Expression 61]

$$= K \left\{ \int_{-\infty}^{\infty} |\Gamma(z)| \cdot |\Gamma(z-d)| dz \right\}^2$$

where, $$\Gamma(z) \cong \int_{-\infty}^{\infty} S(\omega) \exp \left\{ i \left[ \frac{\beta'' z_0 - \beta''_{ref} L_{ref}}{2} (\omega - \omega_0)^2 - \frac{\omega - \omega_0}{v_g} z \right] \right\} d\omega$$

$$D = -\frac{2\pi c}{\lambda^2} \beta''$$

S(ω): spectral density function of known incident light
d: relative delay difference between first and second interference signal detecting means
ω₀: central frequency of incident light
$v_g$: group velocity of optical waveguide (can be calculated from refractive index or the like of optical waveguide)
$z_0$: length of section extending from incident end of the optical waveguide to arbitrary point along the way
λ: central wavelength of incident light
K: constant
$|I_1|^2$, $|I_2|^2$: squares of absolute values of $I_1$ and $I_2$.

$\overline{|I|^2}$:average of $|I_1|^2$ and $|I_2|^2$  [Numerical Expression 62]

A typical example of a scattering phenomenon in an optical waveguide which can be used in the present invention is Rayleigh scattering generated by fluctuation in refractive index in a small space region of the optical waveguide. Furthermore, a scattering phenomenon in which a local scattering coefficient is independent of time, such as a scattering phenomenon generated by incompleteness of, for example, a waveguide structure or a scattering phenomenon generated by containing an impurity can be used in the present invention. In contradiction to this, Brillouin scattering, Raman scattering, or the like known as a scattering phenomenon in an optical waveguide is generated by exciting acoustic phonons or optical phonons in an optical fiber, respectively. However, these local scattering coefficients fluctuate with time because the phonons are repeatedly generated and extinguished in a predetermined life cycle. These phenomena cannot be used in the present invention. This is because a correlational function of a scattered light amplitude or a scattered light intensity is eliminated by a fluctuation in local scattering intensity with time and cannot be measured.

The scattering phenomenon generated by incompleteness of the waveguide structure or the scattering phenomenon generated by containing an impurity decreases with improvement of quality of the waveguide, and cannot be observed in an ideal waveguide. In a high-quality waveguide, these scattering phenomena can be observed at only a limited position of the waveguide. On the other hand, since Rayleigh scattering is always observed at an arbitrary position in an amorphous material, it is assumed that a Rayleigh scattering phenomenon in an optical fiber is used. However, even though another scattering phenomenon is used, these explanations do not essentially change.

In Non-patent Document 2, a technique that analyzes a waveguide having a waveguide dispersion at a high spatial resolution by a configuration similar to that of the present invention is disclosed. In application of the theory disclosed in Non-patent Document 2, when there is a scattering point the position of which can be spatially identified and which is specially stronger than that therearound, a wavelength dispersion of a section till the scattering point can be calculated. On the other hand, in the present invention, by using a scattering phenomenon such as Rayleigh scattering in which respective scattering positions cannot be specified and are uniformly statistically present in a waveguide, a wavelength dispersion in an arbitrary section can be measured by a theory different from that of Non-patent Document 2.

In one of embodiments of the present invention, a variable delay means interlocked with a data acquisition control means is arranged on a path of a the scattered light or wideband spectral light. The data acquisition control means records outputs from a first interference signal detecting means and a second interference signal detecting means on a data acquisition storing means while changing quantity of delay of the variable delay means.

As the optical waveguide, a slab type or channel type optical waveguide, optical fiber, or the like which is used in a planar lightwave circuit and which confines light in a predetermined medium to propagate the light is conceived.

EFFECT OF THE INVENTION

In a method, an apparatus, and a program for measuring wavelength dispersion of an optical waveguide according to the present invention, a wavelength dispersion in an arbitrary section of an optical waveguide can be measured by a method having an essential principle different from a conventional method. More specifically, there is provided a new method of non-destructively measuring a distribution of wavelength dispersions of an optical waveguide in a direction of length of the optical waveguide. A method, an apparatus, and a program for measuring wavelength dispersion without requiring a high-output light source unlike in a conventional technique can be provided.

REFERENCE NUMERALS

Figure 1:
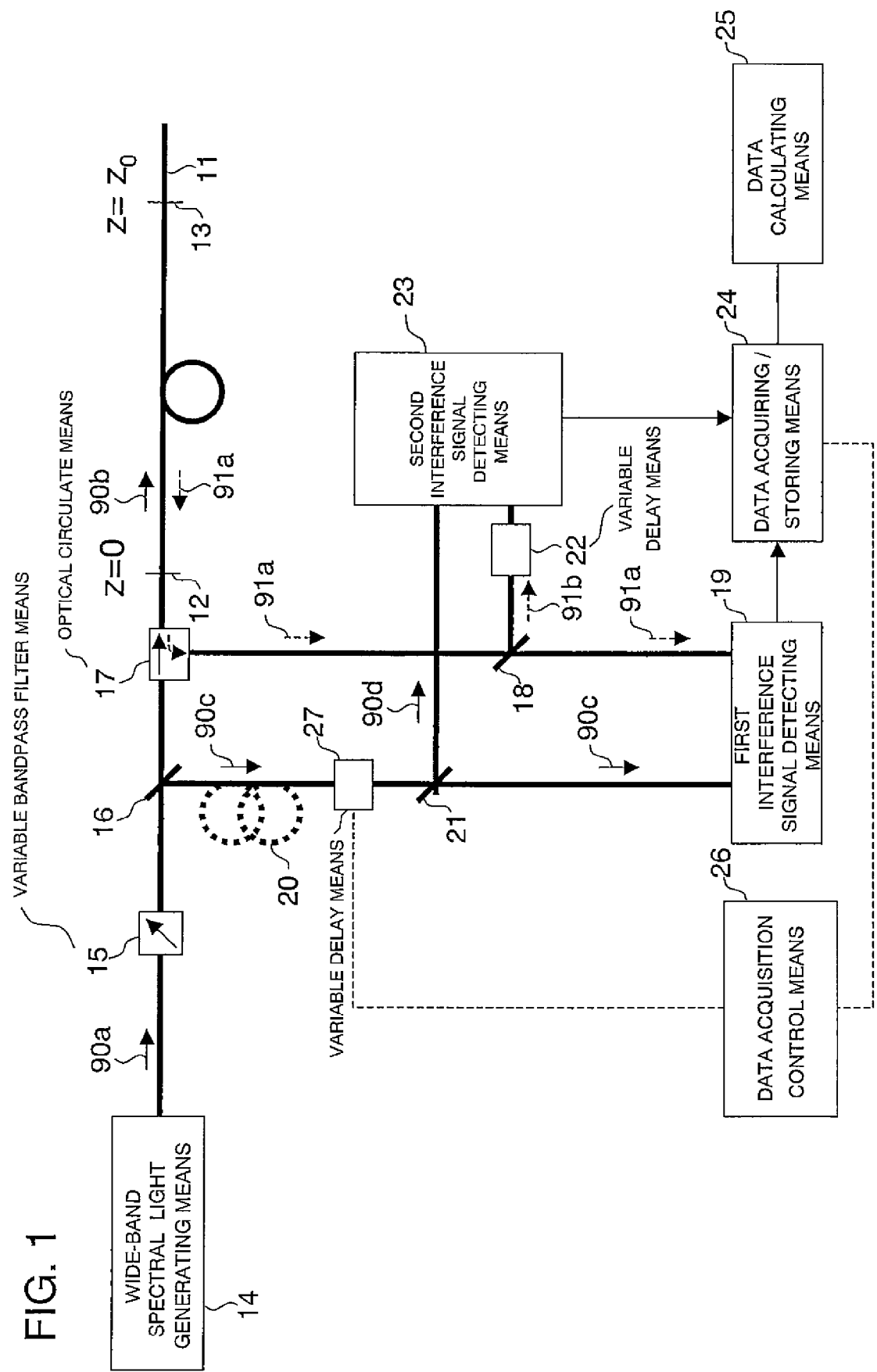
FIG. 1 is an explanatory block diagram showing a wavelength dispersion measuring apparatus for an optical fiber according to Embodiment 1-1 of the present invention.

Reference numerals used in the drawings are as follows. 11: measured optical fiber, 12: incident end, 13: halfway point, 14: wide-band spectral light generating means, 15: variable bandpass filter means, 16: optical splitting means, 17: optical circulate means, 18: optical splitting means, 19: first interference signal detecting means, 20: delay means, 21: optical splitting means, 22: variable delay means, 23: second interference signal detecting means, 24: data acquiring/storing means, 25: data calculating means, 26: data acquisition control means, 27: variable delay means, 28, 29: optical splitting/coupling means, 30: interference signal detecting means, 31, 32, 34, 35: photodiodes, 33, 36: balance type photodetectors, 37: movable mirror, 38: stepwise variable delay means, 39: optical phase modulating means, 40: polarization control means, 41: optical amplifying means, 51: absolute-value-square calculating means, 61: narrow-line-width frequency modulated light generating means, 71: reference dispersion giving means, 90a, b, c, d: reference light, 91a, b: Rayleigh-scattered light, 101: every-distance Rayleigh-scattered light amplitude analyzing means, 102: every-distance Rayleigh-scattered light amplitude data storing means

BEST MODE FOR CARRYING OUT THE INVENTION (Embodiment 1-1) Embodiments of the present invention will be described below in detail with reference to the drawings.

FIG. 1 is an explanatory block diagram showing a wavelength dispersion measuring apparatus for an optical fiber according to Embodiment 1-1 of the present invention. This embodiment describes a case in which an optical waveguide is a measured optical fiber 11. However, the optical waveguide is not limited to the measured optical fiber 11, and a slab type or channel type optical waveguide which is used in a planar lightwave circuit and confirms light in a predetermined medium to propagate the light can also be applied.

As shown in FIG. 1, a wavelength dispersion of a section (to be referred to as a measuring section in the embodiment) extending from an incident end 12 of the measured optical fiber 11 to an arbitrary halfway point 13 is measured. Wide-band spectral light (reference light 90a) having a known spectral density function $S(\omega)$ from a wide-band spectral light generating means 14 is incident on the measured optical fiber 11 through a variable bandpass filter means 15, an optical splitting means 16, and an optical circulate means 17.

Rayleigh-scattered light 91a generated at a halfway point of the measured optical fiber 11 by the wide-band spectral light (reference light 90b) being incident on the measured optical fiber 11 is input to a first interference signal detecting means 19 through the optical circulate means 17 and an optical splitting means 18. Wide-band spectral light (reference light 90c) split by the optical splitting means 16 is input to the first interference signal detecting means 19 through a delay means 20 having delay time equal to propagation time corresponding to twice a length (measuring section length) from the incident end 12 of the measured optical fiber 11, a variable delay means 27 interlocked with a data acquisition control means 26, and an optical splitting means 21. The Rayleigh-scattered light 91b split by the optical splitting means 18 is input to a second interference signal detecting means 23 through a variable delay means 22. A wide-band spectral light (reference light 90d) split by the optical splitting means 21 is input to the second interference signal detecting means 23.

In the first interference signal detecting means 19 and the second interference signal detecting means 23, signals being proportional to Rayleigh-scattered light amplitudes are detected to be input to a data acquiring/storing means 24. In the data acquiring/storing means 24 and a data calculating means 25, a wavelength dispersion of the section extending from the incident end 12 of the measured optical fiber 11 to the arbitrary halfway point 13 is calculated by a correlational function of signals being proportional to the Rayleigh-scattered light amplitudes generated at a plurality of halfway points. The variable delay means 27 and the data acquiring/storing means 24 are controlled by the data acquisition control means 26. The data acquisition control means 26 records outputs from the first interference signal detecting means 19 and the second interference signal detecting means 23 on the data acquiring/storing means 24 while changing quantity of delay of the variable delay means 27.

The first interference signal and the second interference signal detected by the first interference signal detecting means 19 and the second interference signal detecting means 23 are stored by the data acquiring/storing means 24 and guided to the data calculating means 25. In the data calculating means 25, a correlational function between the first interference signal and the second interference signal is calculated by a numerical operation to make it possible to calculate a wavelength dispersion of the measured optical fiber 11 of a predetermined section on the basis of a theoretical expression (will be described later). When the first interference signal and the second interference signal are represented by $I_1$ and $I_2$, respectively, the correlational function between the first interference signal and the second interference signal is given by the following Numerical Expression (80) expressing an ensemble average of products thereof:

$$\overline{I_1 I_2^*}$$ [Numerical Expression 80]

where ☆ is a complex conjugate sign.

In order to calculate the ensemble average, a large number of interference signals must be acquired as data while changing quantity of delay as described above.

According to the theory which is disclosed in Embodiment 1-1 for the first time, the correlational function between the first interference signal $I_1$ and the second interference signal $I_2$ is associated with a dispersion D in the measuring section by the following relational expression (Numerical Expression (81)):

$$\frac{\overline{I_1 I_2^*}}{|I_1|^2} = \frac{\overline{I_1 I_2^*}}{|I_2|^2}$$ [Numerical Expression 81]

$$= \frac{\int_{-\infty}^{\infty} \Gamma(Z)\Gamma^*(Z-d)dZ}{\int_{-\infty}^{\infty} |\Gamma(Z)|^2 dZ}$$

where, $$\Gamma(z) \cong \exp\left[i\frac{\omega_0}{v_p}z\right] \cdot \int_{-\infty}^{\infty} S(\omega)\exp\left\{i\left[\frac{\beta'' z_0}{2}(\omega-\omega_0)^2 - \frac{\omega-\omega_0}{v_g}z\right]\right\}d\omega$$

$$D = -\frac{2\pi c}{\lambda^2}\beta''$$

S(ω): spectral density function of known wide-band spectral light d: relative delay difference between first and second interference signal detecting means 19 and 23

$\omega_0$: central frequency of wide-band spectral light $v_g$: group velocity of the measured optical fiber 11 (can be calculated from refractive index or the like of the measured optical fiber 11)

$z_0$: length of measuring section extending from the incident end 12 of the measured optical fiber 11

λ: central wavelength of wide-band spectral light $|I_1|^2$, $|I_2|^2$: squares of absolute values of $I_1$ and $I_2$ The wide-band spectral light generating means 14 is realized by, for example, a super-luminescent diode and generates a wide-band spectral continuous light having a spectral width of about several ten nanometers. The variable bandpass filter means 15 cuts out spectral light having a central frequency $\omega_0$ and a bandwidth $\Delta_\omega$. The central frequency $\omega_0$ of the spectral light can be varied by the data acquisition control means 26. It is assumed that the spectral density function S(ω) of the continuous light cut out by the variable bandpass filter means 15 is known in advance. In general, an output from the variable bandpass filter means 15 can be approximated by a Gaussian profile and represented as the following Numerical Expression (82).

$$S(\omega) = \frac{\exp\left[\frac{-(\omega - \omega_0)^2}{2(\Delta\omega)^2}\right]}{\sqrt{2\pi}\,\Delta\omega}$$ [Numerical Expression 82]

Here, in Numerical Expression (82), reference symbol $\omega_0$ is a central frequency which can be controlled by the data acquisition control means 26. Reference symbol $\Delta_\omega$ is a bandwidth.

A signal being proportional to a Rayleigh-scattered light amplitude generated at a first halfway point in the measuring section of the measured optical fiber 11 by the wide-band spectral light (reference light 90b) being incident on the measured optical fiber 11 and a signal being proportional to a Rayleigh-scattered light amplitude generated at a second halfway point included in the measuring section of the measured optical fiber 11 and being different from the first halfway point are observed. In order to realize this, in Embodiment 1-1, the Rayleigh-scattered light 91a generated by the wide-band spectral light (reference light 90b) being incident on the measured optical fiber 11 and the wide-band spectral light (reference light 90c) transmitted through the delay means 20 having delay time equal to propagation time corresponding to twice the measuring section and the variable delay means 27 are guided to the first interference signal detecting means 19 and the second interference signal detecting means 23 which have a relative optical path length difference being equal to a distance between the first halfway point and the second halfway point to detect signals as the interference signal $I_1$ being proportional to the Rayleigh-scattered light amplitude from the first halfway point and the interference signal $I_2$ being proportional to the Rayleigh-scattered light amplitude from the second halfway point.

More specifically, after the wide-band spectral light (reference light 90a) passes through the variable bandpass filter means 15, the wide-band spectral light (reference light 90a) is split by two by means of the optical splitting means 16. One of the split lights is guided to the measured optical fiber 11. At this time, the Rayleigh-scattered light 91a caused by a fluctuation in refractive index of glass at an arbitrary point of the measured optical fiber 11 is generated, and the generated Rayleigh-scattered light 91a is guided to the first and second interference signal detecting means 19 and 23 through the optical circulate means 17. The other wide-band spectral light (reference light 90c) of the lights split by the optical splitting means 16 is guided to the first and second interference signal detecting means 19 and 23 through the delay means 20 having delay time equal to propagation time corresponding to twice the measuring section length and the variable delay means 27. The delay means 20 having delay time equal to the propagation time corresponding to twice the measuring section length is set so as to make the optical path lengths of the following optical paths 1 and 2 equal to each other.

Optical path 1: optical splitting means 16→optical circulate means 17→arbitrary reflection point (of Rayleigh scattering) of measured optical fiber 11→optical circulate means 17→first and second interference signal detecting means 19 and 23. Optical path 2: optical splitting means 16→first and second interference signal detecting means 19 and 23.

More specifically, this can be realized by changing connections of a fixed delay line of an optical fiber. The length of the optical fiber is changed to make it possible to arbitrarily change a measuring section.

The reference light 90c and the Rayleigh-scattered light 91a are split by two by the optical splitting means 21 and 18, respectively. The first interference signal detecting means 19 and the second interference signal detecting means 23 which have a relative optical path length difference equal to a distance between the first halfway point and the second halfway point of the measured optical fiber 11 detect interference signals generated by the reference lights 90c and 90d and the Rayleigh-scattered lights 91a and 91b. When the delay means 20 having delay time equal to propagation time corresponding to twice the measuring section length and the variable delay means 27 are inserted into the path of the reference light 90c, the interference signal $I_1$ being proportional to the Rayleigh-scattered light amplitude from the first halfway point of the measured optical fiber 11 is output from the first interference signal detecting means 19. On the other hand, from the second interference signal detecting means 23, the interference signal $I_2$ being proportional to the Rayleigh-scattered light amplitude is output from the second halfway point of the measured optical fiber 11.

In this embodiment, the interference signals detected by the first interference signal detecting means 19 and the second interference signal detecting means 23 are finally guided to the data calculating means 25 to make it possible to derive a wavelength dispersion of a predetermined section of the measured optical fiber 11 by a theoretical expression given by a knowledge (will be described later).

The first and second interference signal detecting means 19 and 23 can be constituted by a heterodyne detecting technique or a homodyne detecting technique which is a known technique. As constituent elements thereof, several variations can be conceived.

Figure 2:
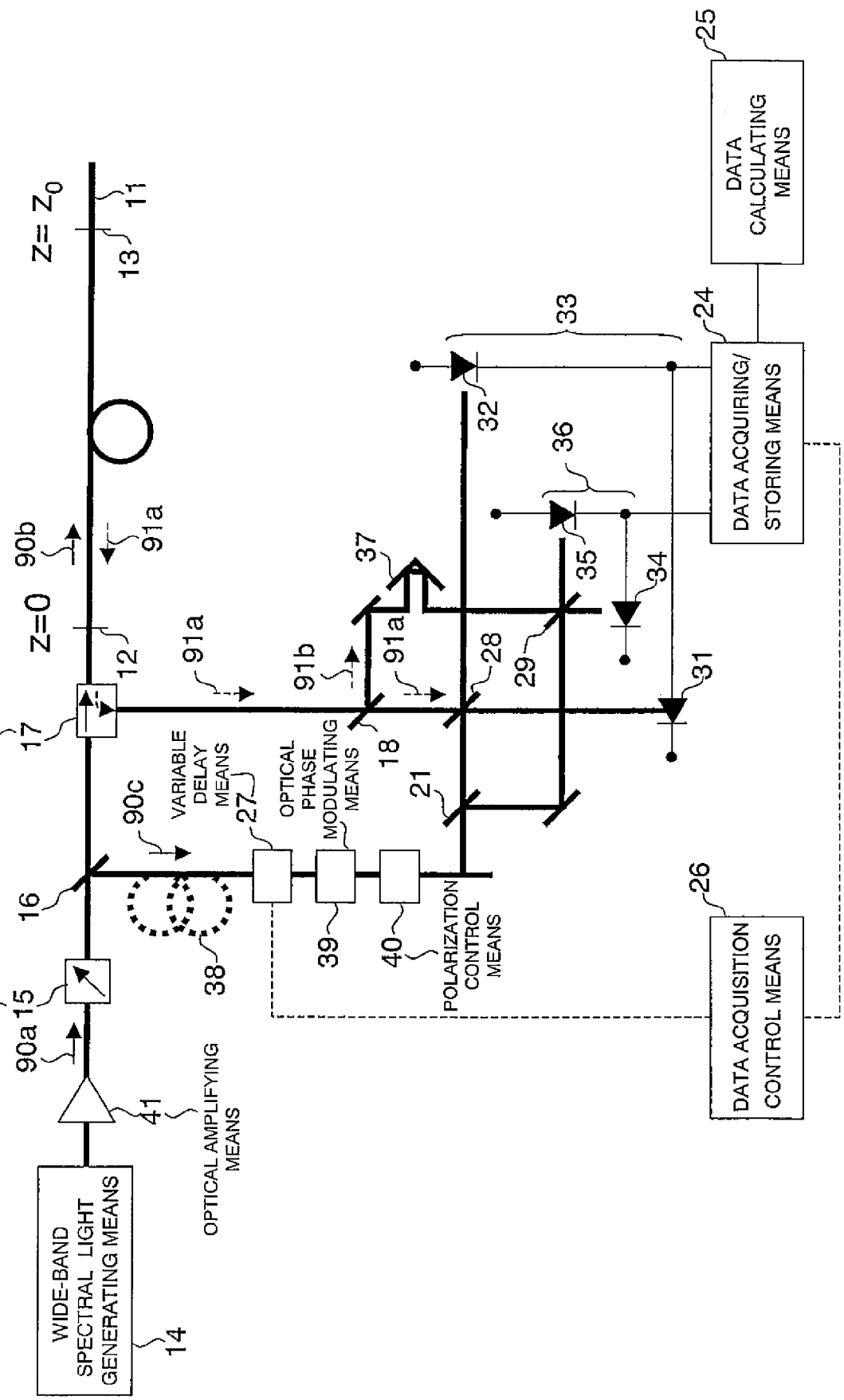
FIG. 2 is an explanatory block diagram showing an example of an interference signal detecting means according to Embodiment 1-1 of the present invention.

FIG. 2 is an explanatory block diagram showing an example of an interference signal detecting means according to Embodiment 1-1 of the present invention. The same reference numerals as in FIG. 1 denote the same parts in FIG. 2, and a description thereof will not be repeated. In FIG. 2, as the first interference signal detecting means 19 (FIG. 1), a balance type photodetector 33 constituted by photodiodes 31 and 32 is arranged. As the second interference signal detecting means 23 (in FIG. 1), a balance type photodetector 36 constituted by photodiodes 34 and 35 is arranged. As a variable delay means 22 (FIG. 1), a movable mirror (delay giving unit) 37 is arranged. As the delay means 20 (FIG. 1) having delay time equal to propagation time corresponding to twice the length of the measuring section extending from the incident end 12 of the measured optical fiber 11, a stepwise variable means 38 is arranged. Between the stepwise variable delay means 38 and the optical splitting means 21, the variable delay means 27, an optical phase modulating means ($\omega_m$) 39, and a polarization control means 40 are arranged. An optical amplifying means 41 is arranged between the wide-band spectral light generating means 14 and the variable bandpass filter means 15.

As shown in FIG. 2, the optical phase modulating means ($\omega_m$) 39 phase-modulates the reference light 90c by a sine wave consisting of a specific frequency $\omega_m$. The phase-modulated lights are coupled by optical splitting/coupling means 28 and 29 and photoelectrically converted by the balance type photodetector 33 and a balance type photodetector 36. Thereafter, the intensity of a frequency component consisting of the frequency $\omega_m$ in the data acquiring/storing means 24 and the data calculating means 25 is measured by a spectral analyzing means (not shown) to make it possible to observe coherent correlation. The polarization control means 40 is to cope with a fluctuation in polarization caused by an optical fiber and adjusts a polarization state of the reference light 90c to such that the interference signal intensity is maximum.

The distance between the first halfway point and the second halfway point of the measured optical fiber 11, i.e., a relative delay difference d between the first interference signal detecting means 19 and the second interference signal detecting means 23 is preferably set as follows in accordance with a bandwidth $\Delta_\omega$ of a wide-band spectral light to be used by changing delay time $\tau$ in the variable delay means 22. Even though these parameters are set at any values, measurement is not impossible. However, there is a setting range in which the measurement can be performed at relatively high accuracy. A measuring section length is represented by $z_0$, and a predicted wavelength dispersion in the measuring section is given by the following Numerical Expression (83).

$$\tilde{D}$$ [Numerical Expression 83]

When a spectral density function is assumed as Numerical Expression (82), observation with the maximum accuracy can be performed when the following Numerical Expression (84) representing coherence time of wide-band spectral light when the wide-band spectral light reciprocates in a measuring section is equal to d/c (c is velocity of light). This is because observation at high accuracy can be performed since quantity of observation given by Numerical Expression (89) (will be described later) is 1 when d=0, is 0 when d=∞, and is the maximum differential coefficient to the wavelength dispersion when d/c=$T_c$.

$$T_c = \frac{1}{\Delta\omega}\left[1 + \left(\frac{2\ln2\lambda^2\Delta\omega^2\tilde{D}z_0}{\pi c}\right)^2\right]^{\frac{1}{2}}$$ [Numerical Expression 84]

$\lambda$: central wavelength of incident light
$z_0$: length of measuring section extending from the incident end 12 of the measured optical fiber 11

A set range required in Numerical Expression (84) has a common width. When the set range is approximately given by 0.1 $T_c$<d/c<10 $T_c$, measurement can be sufficiently performed. In actual measurement, when the wavelength dispersion cannot be predicted at all, measurement may be performed any number of times while changing d or $\Delta_\omega$. When, as numerical examples, $\Delta_\omega$=100 GHz/2$\pi$, $\lambda$=1.55 µm, and L=1 km are given, and when the Numerical Expression (83) is given by a condition expressed by the following expression (85), d is about 25 mm.

$$\tilde{D}=1 \text{ ps/nm/km}$$ [Numerical Expression 85]

In Embodiment 1-1, a wavelength dispersion of a section extending from the incident end 12 of the optical fiber to the arbitrary halfway point 13 is calculated from the following Numerical Expression (86) expressing a correlational function between the interference signal $I_1$ being proportional to the Rayleigh-scattered light amplitude generated at the first halfway point and the interference signal $I_2$ being proportional to the Rayleigh-scattered light amplitude generated at the second halfway point.

$$\overline{I_1I_2^*}$$ [Numerical Expression 86]

In order to calculate the correlational function between the interference signal $I_1$ being proportional to the Rayleigh-scattered light amplitude generated at the first halfway point and the interference signal $I_2$ being proportional to the Rayleigh-scattered light amplitude generated at the second halfway point, the variable delay means 27 is arranged on the path of the scattered light or the wide-band spectral light, the plurality of interference signals $I_1$ and $I_2$ are detected while changing quantity of delay of the variable delay means 27, and an ensemble averages of these signals is calculated. In this manner, the correlational function between the interference signals $I_1$ and $I_2$ can be calculated as the following Numerical Expression (87).

$$\overline{I_1I_2^*}$$ [Numerical Expression 87]

For this reason, the variable delay means 27 can be controlled by the data acquisition control means 26. The quantity of delay of the variable delay means 27 for each measurement must be larger than a coherent length of the wide-band spectral light because independent Rayleigh scattering must be observed every measurement. This delay distance is about 18 mm (corresponding value in vacuum) when, for example, the spectral width of the wide-band spectral light is $\Delta_\omega$=100 GHz/2$\pi$.

The interference signals $I_1$ and $I_2$ observed in Embodiment 1-1 are complex variables having amplitudes and phases. According to the configuration in FIG. 2, although a current observed by the balance type photodetectors 33 and 36 is vibrated at a frequency $\omega_m$, the amplitude (intensity) and the phase of the current are observed to determine the interference signals $I_1$ and $I_2$ which are complex variables.

In Embodiment 1-1, from Numerical Expression (88) expressing the correlational function calculated as described above, the dispersion D in the measuring section can be calculated by the following theoretical expression Numerical Expression (89):

$$\overline{I_1 I_2^*} \quad \text{[Numerical Expression 88]}$$

$$\frac{\overline{I_1 I_2^*}}{|I_1|^2} = \frac{\overline{I_1 I_2^*}}{|I_2|^2} = \frac{\int_{-\infty}^{\infty} \Gamma(Z) \Gamma^*(Z-d) dZ}{\int_{-\infty}^{\infty} |\Gamma(Z)|^2 dZ} \quad \text{[Numerical Expression 89]}$$

where, $$\Gamma(z) \cong \exp\left[i\frac{\omega_0}{v_p}z\right] \cdot$$

$$\int_{-\infty}^{\infty} S(\omega) \exp\left\{i\left[\frac{\beta'' z_0}{2}(\omega-\omega_0)^2 - \frac{\omega-\omega_0}{v_g}z\right]\right\} d\omega$$

$$D = -\frac{2\pi c}{\lambda^2} \beta''$$

$S(\omega)$: spectral density function of known wide-band spectral light
d: relative delay difference between first and second interference signal detecting means 19 and 23
$\omega_0$: central frequency of wide-band spectral light
$v_g$: group velocity of the measured optical fiber 11 (can be calculated from refractive index or the like of the measured optical fiber 11)
$z_0$: length of measuring section extending from the incident end 12 of the measured optical fiber 11
$\lambda$: central wavelength of wide-band spectral light
$|I_1|^2, |I_2|^2$: squares of absolute values of $I_1$ and $I_2$ The reason why the above theoretical expression is appropriate will be described below. The waveform of the wide-band spectral light can be represented as the following Numerical Expression (90).

$$\Psi(t) = \int_{-\infty}^{\infty} A(\omega) \exp\{i[k(\omega)z - \omega t]\} d\omega \quad \text{[Numerical Expression 90]}$$

In this expression, reference symbol $A(\omega)$ denotes an electric field amplitude component which is Fourier-dissolved. The following Numerical Expression (91) is established.

$$S(\omega) = \frac{|A(\omega)|^2}{2\pi} \quad \text{[Numerical Expression 91]}$$

In Numerical Expression (90), reference symbol k is a propagation constant, and the path of the reference light 90c is nondispersive. For this reason, the following Numerical Expression (92) is established.

$$k(\omega) = \frac{\omega_0}{v_p} + \frac{\omega-\omega_0}{v_g} \quad \text{[Numerical Expression 92]}$$

The Rayleigh-scattered lights 91a from respective points $z_1$ of the optical fiber is expressed by the following Numerical Expression (93) in the inputs to the first and second interference signal detecting means 19 and 23:

$$\Psi_r(t) = \alpha(z_i) \cdot \int_{-\infty}^{\infty} A(\omega) \exp\{i[2\beta(\omega)z_i - \omega t]\} d\omega \quad \text{[Numerical Expression 93]}$$

In this equation, $a(z_i)$ denotes a scattering coefficient (local refractive index) in $z_1$. In Numerical Expression (93), $\beta(\omega)$ denotes a propagation constant of the optical fiber. According to the Taylor expansion, $\beta(\omega)$ can be represented as the following Numerical Expression (94):

$$\beta(\omega) = \frac{\omega_0}{v_p} + \frac{\omega-\omega_0}{v_g} + \frac{\beta''}{2}(\omega-\omega_0)^2 \quad \text{[Numerical Expression 94]}$$

In Numerical Expression (94), reference symbol $v_p$ denotes a phase velocity of light, reference numeral $v_g$ denotes a group velocity of light, and a value $\beta''$ has a relationship given by the following Numerical Expression (95) to the wavelength dispersion D. When the value $\beta''$ is calculated, the D can be calculated:

$$D = -\frac{2\pi c}{\lambda^2} \beta'' \quad \text{[Numerical Expression 95]}$$

When a total sum of Numerical Expression (93) with respect to $z_i$ is calculated, an amplitude of the Rayleigh-scattered light 91a is obtained as follows:

$$\Psi_{total}(t) = \quad \text{[Numerical Expression 96]}$$

$$\sum_i a(z_i) \cdot \int_{-\infty}^{\infty} A(\omega) \exp\left\{i\left[\frac{2\beta(\omega)z_i - }{\omega t}\right]\right\} d\omega$$

Outputs from the first interference signal detecting means and the second interference signal detecting means 23 are given by the following Numerical Expression (97):

$$I_1 = \langle |\Psi_{total}(t) + \Psi(t)|^2 \rangle$$

$$I_2 = \langle |\Psi_{total}(t) + \Psi(t+d/c)|^2 \rangle \quad \text{[Numerical Expression 97]}$$

(d expresses delay length obtained by the variable delay means 22, c expresses velocity of light, and <> expresses time averaging operation.).

For this reason, when Numerical Expression (90) and Numerical Expression (96) are assigned to Numerical Expression (97) to neglect a DC component, the following Numerical Expression 98 is given:

$$I_1 = \left\langle \left| \sum_i a(z_i) \cdot \int_{-\infty}^{\infty} A(\omega) \exp\left\{ i\left[ \frac{2\beta(\omega)z_i - }{\omega t} \right] \right\} d\omega + \int_{-\infty}^{\infty} A(\omega) \exp\{i[k(\omega)z_0 - \omega t]\} d\omega \right|^2 \right\rangle \quad \text{[Numerical Expression 98]}$$

$$= \sum_i a(z_i) \int_{-\infty}^{\infty} S(\omega) \exp\left\{ i \left[ \begin{array}{c} \frac{\beta''}{2}(\omega - \omega_0)^2 z_i + \\ \frac{\omega - \omega_0}{v_g} z_i + \\ \frac{\omega_0}{v_p} z_i \end{array} \right] \right\} d\omega$$

$$= \sum_i a(z_i) \Gamma(z_i)$$

$$I_2 = \left\langle \left| \sum_i a(z_i) \cdot \int_{-\infty}^{\infty} A(\omega) \exp\{i[2\beta(\omega)z_i - \omega t]\} d\omega + \int_{-\infty}^{\infty} A(\omega) \exp\{i[k(\omega)(z+d) - \omega t]\} d\omega \right|^2 \right\rangle$$

$$= \sum_i a(z_i) \int_{-\infty}^{\infty} S(\omega) \exp\left\{ i \left[ \begin{array}{c} \frac{\beta''}{2}(\omega - \omega_0)^2(z_i - d) + \\ \frac{\omega - \omega_0}{v_g}(z_i - d) + \\ \frac{\omega_0}{v_p}(z_i - d) \end{array} \right] \right\} d\omega$$

$$= \sum_i a(z_i) \Gamma(z_i - d) \exp\left[ i \frac{\omega_0}{v_p}(z_i - d) \right]$$

where, $$\Gamma(z) = \exp\left[ i \frac{\omega_0}{v_p} z \right] \cdot \int_{-\infty}^{\infty} S(\omega) \exp\left\{ i \left[ \begin{array}{c} \frac{\beta''}{2}(\omega - \omega_0)^2 z - \\ \frac{\omega - \omega_0}{v_g} z \end{array} \right] \right\} d\omega$$

In general, $\Gamma(z)$ is called a coherence function of wideband spectral light. In this case, when it is assumed that $\beta'' z/2$ changes by only quantity which is considerably smaller than $2\pi$ with reference to a change of $z$ which is almost equal to $d$, $\Gamma(z)$ may be expressed by the following numerical expression:

$$\Gamma(z) \cong \exp\left[ i \frac{\omega_0}{v_p} z \right] \cdot \int_{-\infty}^{\infty} S(\omega) \exp\left\{ i \left[ \begin{array}{c} \frac{\beta'' z_0}{2}(\omega - \omega_0)^2 - \\ \frac{\omega - \omega_0}{v_g} z \end{array} \right] \right\} d\omega \quad \text{[Numerical Expression 99]}$$

A correlational function of these interference signals is given by the following numerical expression:

$$\overline{I_1 I_2^*} = \overline{\sum_i a(z_i) \Gamma(z_i) \times \sum_j a^*(z_j) \Gamma^*(z_j - d)} \quad \text{[Numerical Expression 100]}$$

$$= \sum_i \overline{|a(z_i)|^2} \Gamma(z_i) \Gamma^*(z_i - d) +$$

$$\sum_{i \neq j} \overline{a(z_i) a^*(z_j)} \Gamma(z_i) \Gamma^*(z_i - d)$$

-continued $$= \sum_i \overline{a^2(z_i)} \Gamma(z_i) \Gamma^*(z_i - d) +$$

$$\sum_{i \neq j} \overline{a(z_i) a^*(z_j)} \Gamma(z_i) \Gamma^*(z_i - d)$$

Since $\overline{a(z_i) a^*(z_j)} = 0$ is satisfied due to randomness of $a(z_i)$, the following equation is satisfied:

$$\overline{I_1 I_2^*} = \sum_i \overline{|a(z_i)|^2} \Gamma(z_i) \Gamma(z_i - d)$$

When a standard deviation of $a(z_i)$ is represented by $\sigma$, the following numerical expression is satisfied:

$$\overline{|a(z_i)|^2} = \sigma^2 \quad \text{[Numerical Expression 101]}$$

When the following numerical expression is replaced with integration, $$\sum_i \quad \text{[Numerical Expression 102]}$$

the following numerical expression is obtained:

$$\overline{I_1 I_2^*} = \sigma^2 \int_{-\infty}^{\infty} \Gamma(z) \Gamma^*(z-d) dZ \quad \text{[Numerical Expression 103]}$$

When $d=0$ is given in Numerical Expression (103), the following numerical expression is satisfied:

$$\overline{|I_1|^2} = \overline{|I_2|^2} = \sigma^2 \int_{-\infty}^{\infty} |\Gamma(z)|^2 dZ = \sigma^2 \quad \text{[Numerical Expression 104]}$$

$$\int_{-\infty}^{\infty} \left| \int_{-\infty}^{\infty} S(\omega) \exp\left\{ i \left[ \begin{array}{c} \frac{\beta'' z_0}{2}(\omega - \omega_0)^2 - \\ \frac{\omega - \omega_0}{v_g} z \end{array} \right] \right\} d\omega \right|^2 dZ$$

According to Numerical Expression (103) and Numerical Expression (104), the following numerical expression is satisfied:

$$\frac{\overline{I_1 I_2^*}}{\overline{|I_1|^2}} = \frac{\overline{I_1 I_2^*}}{\overline{|I_1|^2}} \quad \text{[Numerical Expression 105]}$$

$$= \frac{\int_{-\infty}^{\infty} \Gamma(z) \Gamma^*(z-d) dZ}{\int_{-\infty}^{\infty} |\Gamma(z)|^2 dZ}$$

When Γ(z) is restored according to Numerical Expression (98) of Γ(z), the following numerical expression is obtained:

$$\frac{\overline{I_1 I_2^*}}{|I_1|^2} = \frac{\int_{-\infty}^{\infty} \int_{-\infty}^{\infty} S(\omega) \exp\left\{i\left[\frac{\beta'' z_0}{2}(\omega-\omega_0)^2 - \frac{\omega-\omega_0}{v_g}z\right]\right\} d\omega}{\int_{-\infty}^{\infty} \left|\int_{-\infty}^{\infty} S(\omega) \exp\left\{i\left[\frac{\beta'' z_0}{2}(\omega-\omega_0)^2 - \frac{\omega-\omega_0}{v_g}z\right]\right\} d\omega\right|^2 dZ}$$

[Numerical Expression 106]

Numerical Expression (106) is an integral equation to β" when S(ω), $z_0$, and d are known. According to a numerical calculation, the equation can be solved with respect to β". Therefore, according to the means described above, quantity given by the following expression:

$$\frac{\overline{I_1 I_2^*}}{|I_1|^2}$$

[Numerical Expression 107]

is experimentally calculated. The quantity is assigned to Numerical Expression (107) to solve Numerical Expression (106) with respect to β", so that a dispersion β" of a section till $z_0$ can be calculated.

Figure 3:
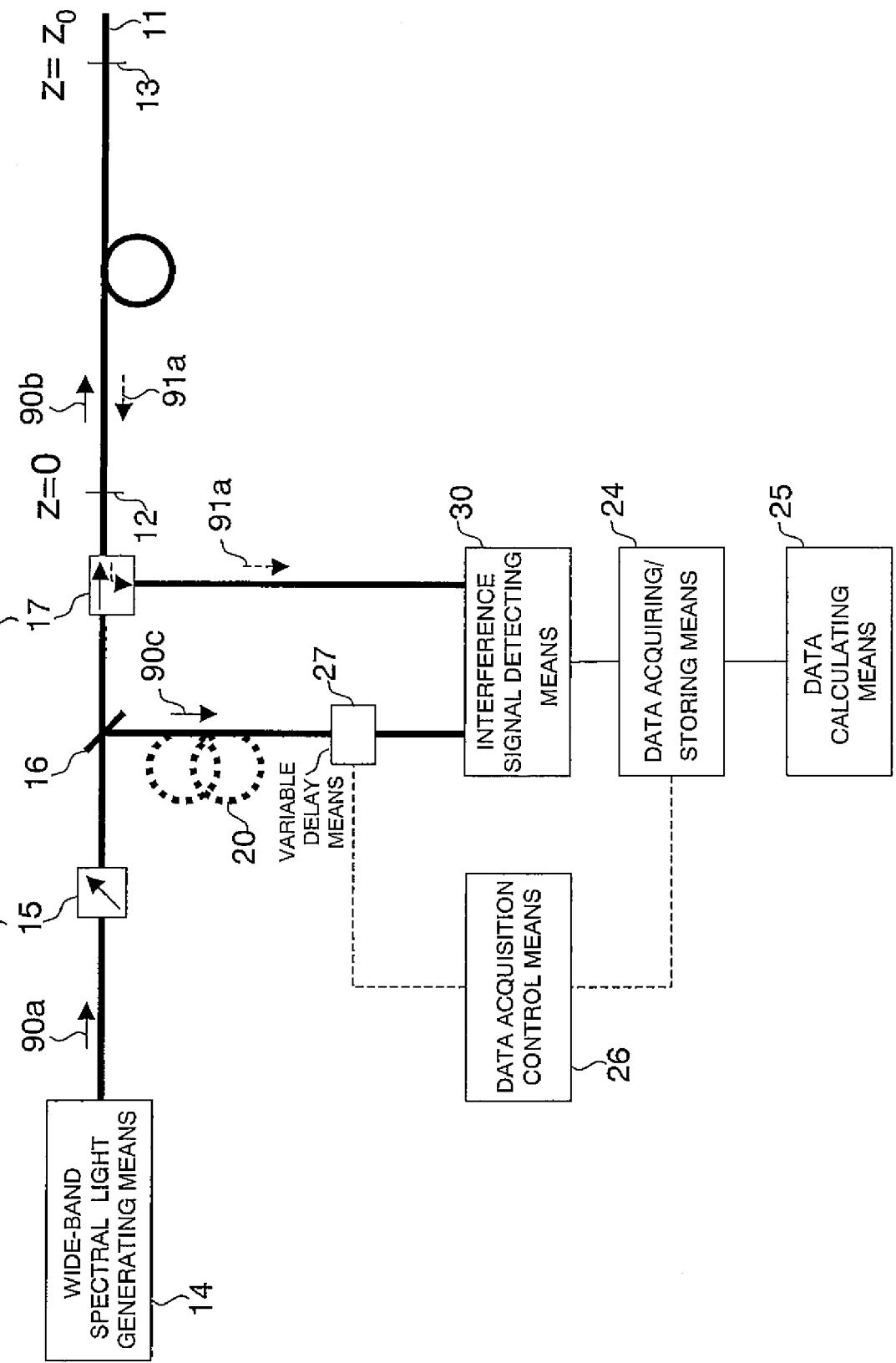
FIG. 3 is an explanatory block diagram showing a wavelength dispersion measuring apparatus for an optical fiber according to Embodiment 1-2 of the present invention.

(Embodiment 1-2) FIG. 3 is an explanatory block diagram showing a wavelength dispersion measuring apparatus for an optical fiber according to Embodiment 1-2 of the present invention. This embodiment will describe a case in which an optical waveguide is a measured optical fiber 11. The optical waveguide is not limited to the measured optical fiber 11, and a slab type or channel type optical waveguide which is used in a planar lightwave circuit and which confines light in a predetermined medium to propagate the light can also be applied. The same reference numerals as in Embodiment 1-1 denote the same parts in Embodiment 1-2.

As shown in FIG. 3, a wavelength dispersion of a section (to be referred as a measuring section hereinafter in the embodiment) extending from an incident end 12 of a measured optical fiber 11 to an arbitrary halfway point 13 is measured. Wide-band spectral light (reference light 90a) having a known spectral density function S(ω) from a wide-band spectral light generating means 14 is incident on the measured optical fiber 11 through a variable bandpass filter means 15, an optical splitting means 16, and an optical circulate means 17. Rayleigh-scattered light 91a generated at a halfway point of the measured optical fiber 11 by the wide-band spectral light (reference light 90b) being incident on the measured optical fiber 11 is input to an interference signal detecting means 30 serving as a first interference signal detecting means and a second interference signal detecting means through the optical circulate means 17. Wide-band spectral light (reference light 90c) split by the optical splitting means 16 is input to the interference signal detecting means 30 through a delay means 20 having delay time equal to propagation time corresponding to twice a length of a measuring section from the incident end 12 of the measured optical fiber 11 and a variable delay means 27 interlocked with a data acquisition control means 26.

In the interference signal detecting means 30, signals being proportional to Rayleigh-scattered light amplitudes are detected to be input to a data acquiring/storing means 24 and a data calculating means 25. In the data acquiring/storing means 24 and the data calculating means 25, a wavelength dispersion of the section extending from the incident end 12 of the measured optical fiber 11 to the arbitrary halfway point 13 is calculated by a correlational function of signals being proportional to the Rayleigh-scattered light amplitudes generated at a plurality of halfway points. The variable delay means 27 and the data acquiring/storing means 24 are controlled by the data acquisition control means 26. The data acquisition control means 26 records outputs from the interference signal detecting means 30 on the data acquiring/storing means 24 while changing quantity of delay of the variable delay means 27. The interference signals detected by the interference signal detecting means 30 are stored by the data acquiring/storing means 24 and guided to the data calculating means 25. In the data calculating means 25, a correlational function between the interference signals is calculated by a numerical operation to calculate a dispersion of the measured optical fiber 11 in the predetermined section.

The interference signal detecting means 30 detects the interference signal I in each case while the variable delay means 27 interlocked with the data acquisition control means 26 continuously changes delay time τ to cause the data acquiring/storing means 24 to record the interference signals I as functions of delay time τ (=d/c). At this time, the interference signals I are periodically oscillated at intervals of wide-band spectral light (reference light 90a), and an amplitude and a phase are measured to observe a complex number I. Therefore, in case of Embodiment 1-2, as accuracy of the variable delay means 27 interlocked with the data acquisition control means 26, accuracy higher than that of a wavelength of light is required. However, this accuracy can be sufficiently achieved by a step pulse motor or the like. In this manner, a plurality of numerical values at two arbitrary points time d/c distant from each other are extracted from I(τ) recorded as functions of the delay time τ. When an ensemble average of these numerical values is calculated, a correlational function between the values time d/c distant from each other in the above Embodiment 1-1:

$$\overline{I_1 I_2^*}$$

[Numerical Expression 108]

can be calculated. More specifically, by using the measured I(τ), by the following numerical expression:

$$\overline{I_1 I_2^*} = \langle I(\tau_i) I(\tau_i + d/c) \rangle_i \quad \text{[Numerical Expression 109]}$$

(where $\langle \rangle_i$ is an averaging operation with respect to $\tau_j$), the following numerical expression:

$$\overline{I_1 I_2^*} \quad \text{[Numerical Expression 110]}$$

may be calculated.

A theoretical calculation performed after a value given by the following expression:

$$\overline{I_1 I_2^*} \quad \text{[Numerical Expression 111]}$$

is the same as that in the above-described Embodiment 1-1.

The present invention is not directly limited to the example of the above embodiment. In an execution phase, the invention can be embedded by modifying constituent elements within range without departing from the spirit and scope of the invention. Appropriate combinations of a plurality of constituent elements disclosed in the above embodiment can constitute various inventions. For example, several constituent elements may be omitted from all the constituent elements disclosed in the embodiments. Furthermore, the constituent elements across different embodiments may be appropriately combined to each other.

(Embodiment 2-1) An embodiment of the present invention will be described below with reference to the drawings.

Figure 4:
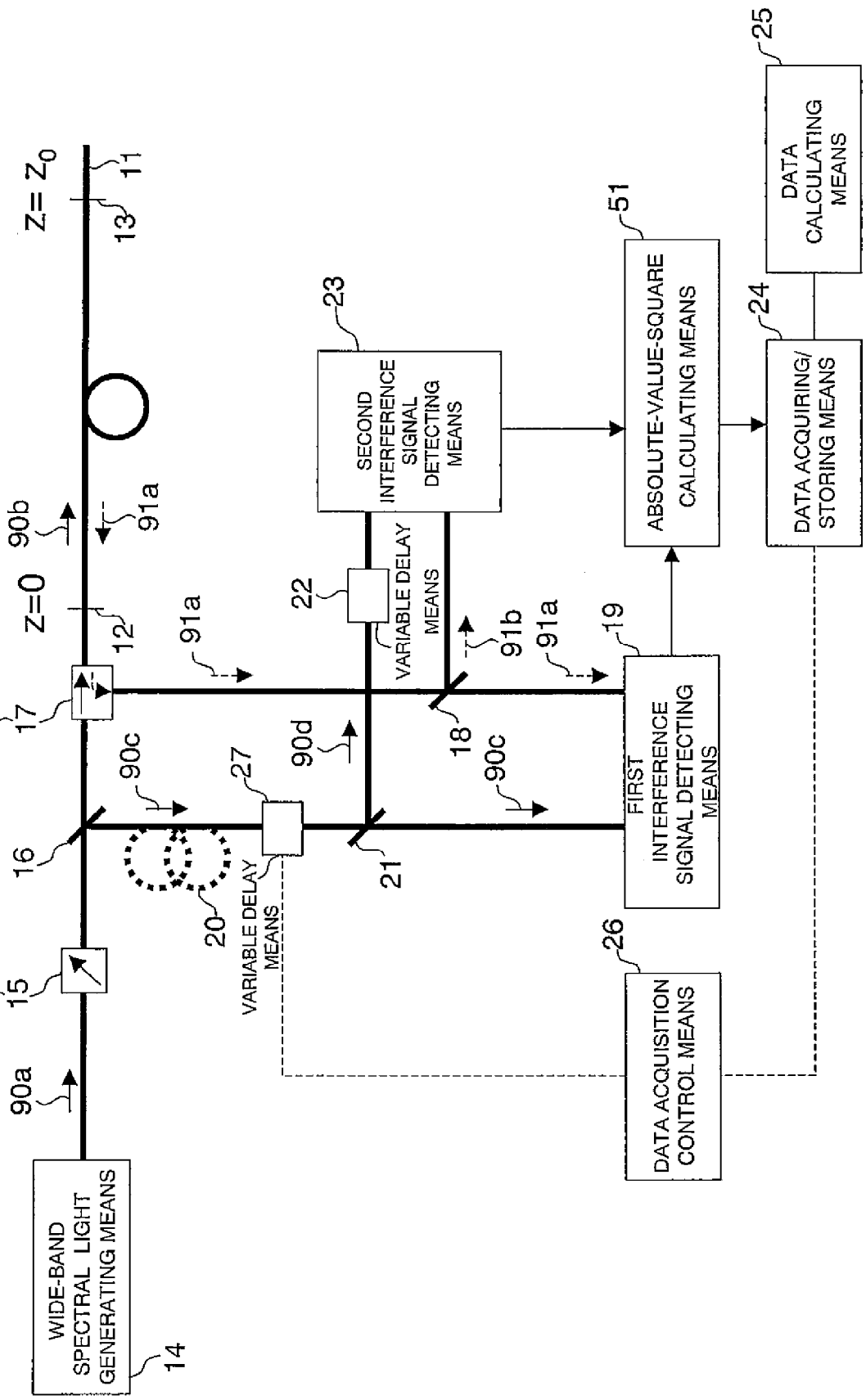
FIG. 4 is an explanatory block diagram showing a wavelength dispersion measuring apparatus for an optical fiber according to Embodiment 2-1 of the present invention.

FIG. 4 is an explanatory block diagram showing a wavelength dispersion measuring apparatus for an optical fiber according to Embodiment 2-1 of the present invention. This embodiment describes a case in which an optical waveguide is a measured optical fiber 11. However, the optical waveguide is not limited to the measured optical fiber 11, and a slab type or channel type optical waveguide which is used in a planar lightwave circuit and confines light in a predetermined medium to propagate the light can also be applied.

As shown in FIG. 4, a wavelength dispersion of a section (to be referred to as a measuring section in the embodiment) extending from an incident end 12 of the measured optical fiber 11 to an arbitrary halfway point 13 is measured. Wideband spectral light (reference light 90a) having a known spectral density function S(ω) from a wide-band spectral light generating means 14 is incident on the measured optical fiber 11 through a variable bandpass filter means 15, an optical splitting means 16, and an optical circulate means 17. Rayleigh-scattered light 91a generated at a halfway point of the measured optical fiber 11 by the wide-band spectral light (reference light 90b) being incident on the measured optical fiber 11 is input to a first interference signal detecting means 19 through the optical circulate means 17 and an optical splitting means 18. Wide-band spectral light (reference light 90c) split by the optical splitting means 16 is input to the first interference signal detecting means 19 through a delay means 20 having delay time equal to propagation time corresponding to twice a length (measuring section length) from the incident end 12 of the measured optical fiber 11, a variable delay means 27 interlocked with a data acquisition control means 26, and an optical splitting means 21. The Rayleigh-scattered light 91b split by the optical splitting means 18 is input to a second interference signal detecting means 23. A wide-band spectral light (reference light 90d) split by the optical splitting means 21 is input to the second interference signal detecting means 23 through a variable delay means 22.

In the first interference signal detecting means 19 and the second interference signal detecting means 23, signals being proportional to Rayleigh-scattered light amplitudes are detected to be input to a absolute-value-square calculating means 51, a data acquiring/storing means 24, and a data calculating means 25. In the absolute-value-square calculating means 51, the data acquiring/storing means 24, and the data calculating means 25, a wavelength dispersion of the section extending from the incident end 12 of the measured optical fiber 11 to the arbitrary halfway point 13 is calculated by a correlational function of signals being proportional to the Rayleigh-scattered light intensities generated at a plurality of halfway points. The variable delay means 27 and the data acquiring/storing means 24 are controlled by the data acquisition control means 26. The data acquisition control means 26 records outputs from the first interference signal detecting means 19 on the data acquiring/storing means 24 while changing quantity of delay of the variable delay means 27.

The first interference signal and the second interference signal detected by the first interference signal detecting means 19 and the second interference signal detecting means 23 are stored by the data acquiring/storing means 24. In the absolute-value-square calculating means 51 and the data calculating means 25, a correlational function between the first interference signal and the second interference signal is calculated by a numerical operation to make it possible to calculate a dispersion of the measured optical fiber 11 of a predetermined section on the basis of a theoretical expression (will be described later).

In the wavelength dispersion measuring apparatus for an optical fiber according to Embodiment 2-1 of the present invention it is characterized that a first interference signal $|I_2|^2$ and a second interference signal $|I_2|^2$ detected at this time are proportional to squares of absolute values of the Rayleigh-scattered light amplitudes. This merely means that squares of absolute values of currents detected by the first and second interference signal detecting means 19 and 23 may be measured by the absolute-value-square calculating means 51. Therefore, in the wavelength dispersion measuring apparatus for an optical fiber according to Embodiment 2-1 of the present invention, the first interference signal $|I_1|^2$ and the second interference signal $|I_2|^2$ are positive real numbers.

In the wavelength dispersion measuring apparatus for an optical fiber according to Embodiment 2-1 of the present invention, a dispersion D of an arbitrary section is calculated by a correlational function between the first interference signal $|I_1|^2$ and the second interference signal $|I_2|^2$ obtained by the means described above using the following relational expressions (numerical expressions (112) and (113)).

[Numerical Expression 112]

$$\overline{(|I_1|^2 - \overline{|I|^2})(|I_2|^2 - \overline{|I|^2})} = \overline{|I_1|^2 |I_2|^2} - \overline{|I|^2} \quad (A)$$

$$= K \left\{ \int_{-\infty}^{\infty} |\Gamma(z)| \cdot |\Gamma(z-d)| \, dz \right\}^2$$

where, $$\Gamma(z) \cong \int_{-\infty}^{\infty} S(\omega) \exp \left\{ i \left[ \frac{\beta'' z_0}{2} (\omega - \omega_0)^2 - \frac{\omega - \omega_0}{v_g} z \right] \right\} d\omega \quad (B)$$

$$D = -\frac{2\pi c}{\lambda^2} \beta'' \quad (C)$$

S(ω): spectral density function of known wide-band spectral light d: relative delay difference between first and second interference signal detecting means 19 and 23

$\omega_0$: central frequency of wide-band spectral light $v_g$: group velocity of the measured optical fiber 11 (can be calculated from refractive index or the like of the measured optical fiber 11)

$z_0$: length of measuring section extending from the incident end 12 of the measured optical fiber 11

$\lambda$: central wavelength of wide-band spectral light

K: constant $|I_1|^2, |I_2|^2$: squares of absolute values of $I_1$ and $I_2$ $\overline{|I^2|}$: average of $|I_1|^2$ and $|I_2|^2$ [Numerical Expression 113]

The wide-band spectral light generating means 14 is realized by, for example, a super-luminescent diode and generates a wide-band spectral continuous light having a spectral width of about several ten nanometers. The variable bandpass filter means 15 cuts out spectral light having a central frequency $\omega_0$ and a bandwidth $\Delta_\omega$. The central frequency $\omega_0$ of the spectral light can be varied by the data acquisition control means 26. It is assumed that the spectral density function $S(\omega)$ of the continuous light cut out by the variable bandpass filter means 15 is known in advance. In general, an output from the variable bandpass filter means 15 can be approximated by a Gaussian profile and represented as the following Numerical Expression (114).

$$S(\omega) = \frac{\exp\left[\frac{-(\omega-\omega_0)^2}{2(\Delta\omega)^2}\right]}{\sqrt{2\pi}\,\Delta\omega}$$ [Numerical Expression 114]

Here, in Numerical Expression (114), reference symbol $\omega_0$ is a central frequency which can be controlled by the data acquisition control means 26. Reference symbol $\Delta_\omega$ is a bandwidth.

A signal being proportional to a Rayleigh-scattered light amplitude generated at a first halfway point in the measuring section of the measured optical fiber 11 by the wide-band spectral light (reference light 90b) being incident on the measured optical fiber 11 and a signal being proportional to a Rayleigh-scattered light amplitude generated at a second halfway point included in the measuring section of the measured optical fiber 11 and being different from the first halfway point are observed. In order to realize this, in Embodiment 2-1, the Rayleigh-scattered light 91a generated by the wide-band spectral light (reference light 90b) being incident on the measured optical fiber 11 and the wide-band spectral light (reference light 90c) transmitted through the delay means 20 having delay time equal to propagation time corresponding to twice the measuring section and the variable delay means 27 are guided to the first interference signal detecting means 19 and the second interference signal detecting means 23 which have a relative optical path length being equal to a distance between the first halfway point and the second halfway point to detect signals as the interference signal $I_1$ being proportional to the Rayleigh-scattered light amplitude from the first halfway point and the interference signal $I_2$ being proportional to the Rayleigh-scattered light amplitude from the second halfway point.

More specifically, after the wide-band spectral light (reference light 90a) passes through the variable bandpass filter means 15, the wide-band spectral light (reference light 90a) is split by two by means of the optical splitting means 16. One of the split lights is guided to the measured optical fiber 11. At this time, the Rayleigh-scattered light 91a caused by a fluctuation in refractive index of glass at an arbitrary point of the measured optical fiber 11 is generated, and the generated Rayleigh-scattered light 91a is guided to the first and second interference signal detecting means 19 and 23 through the optical circulate means 17. The other wide-band spectral light (reference light 90c) of the lights split by the optical splitting means 16 is guided to the first and second interference signal detecting means 19 and 23 through the delay means 20 having delay time equal to propagation time corresponding to twice the measuring section length and the variable delay means 27. The delay means 20 having delay time equal to the propagation time corresponding to twice the measuring section length is set so as to make the optical path lengths of the following optical paths 1 and 2 equal to each other.

Optical path 1: optical splitting means 16→optical circulate means 17→arbitrary reflection point (of Rayleigh scattering) of measured optical fiber 11→optical circulate means 17→first and second interference signal detecting means 19 and 23. Optical path 2: optical splitting means 16→first and second interference signal detecting means 19 and 23.

More specifically, this can be realized by changing connections of a fixed delay line of an optical fiber. The length of the optical fiber is changed to make it possible to arbitrarily change a measuring section.

The reference light 90c and the Rayleigh-scattered light 91a are split by two by the optical splitting means 21 and 18, respectively. The first interference signal detecting means 19 and the second interference signal detecting means 23 which have a relative optical path length difference equal to a distance between the first halfway point and the second halfway point of the measured optical fiber 11 detect interference signals generated by the reference lights 90c and 90d and the Rayleigh-scattered lights 91a and 91b. When the delay means 20 having delay time equal to propagation time corresponding to twice the measuring section length and the variable delay means 27 are inserted into the path of the reference light 90c, the interference signal $I_1$ being proportional to the Rayleigh-scattered light amplitude from the first halfway point of the measured optical fiber 11 is output from the first interference signal detecting means 19. On the other hand, from the second interference signal detecting means 23, the interference signal $I_2$ being proportional to the Rayleigh-scattered light amplitude is output from the second halfway point of the measured optical fiber 11.

In this embodiment, the interference signals detected by the first interference signal detecting means 19 and the second interference signal detecting means 23 are finally guided to the absolute-value-square calculating means 51, the data acquiring/storing means 24, and the data calculating means to make it possible to derive a wavelength dispersion of a predetermined section by a theoretical expression given by a knowledge (will be described later).

The first and second interference signal detecting means 19 and 23 can be constituted by a heterodyne detecting technique or a homodyne detecting technique which is a known technique. As constituent elements thereof, several variations can be conceived.

The reason why the above relational expression (Numerical Expression (112)) is established will be described below. The waveform of the wide-band spectral light can be represented as the following Numerical Expression (115).

$\Psi(t) = \int_{-\infty}^{\infty} A(\omega)\exp\{i[k(\omega)z - \omega t]\}d\omega$ [Numerical Expression 115]

In this expression, reference symbol $A(\omega)$ denotes an electric field amplitude component which is Fourier-dissolved. The following Numerical Expression (116) is established.

$$S(\omega) = \frac{|A(\omega)|^2}{2\pi} \qquad \text{[Numerical Expression 116]}$$

In Numerical Expression (116), reference symbol k is a propagation constant, and it is assumed that the path of the reference light 90c is nondispersive. At this time, the following Numerical Expression (117) is established.

$$k(\omega) = \frac{\omega_0}{v_p} + \frac{\omega - \omega_0}{v_g} \qquad \text{[Numerical Expression 117]}$$

The Rayleigh-scattered lights 91a from respective points $z_i$ of the optical fiber is expressed by the following Numerical Expression (118) in the inputs to the first and second interference signal detecting means 19 and 23:

$$\Psi_r(t) = a(z_i) \cdot \int_{-\infty}^{\infty} A(\omega) \exp\{i[2\beta(\omega)z_i - \omega t]\} d\omega \qquad \text{[Numerical Expression 118]}$$

In this equation, $a(z_i)$ denotes a scattering coefficient (local refractive index) in $z_i$. In Numerical Expression (118), $\beta(\omega)$ denotes a propagation constant of the optical fiber. According to the Taylor expansion, $\beta(\omega)$ can be represented as the following Numerical Expression (119):

$$\beta(\omega) = \frac{\omega_0}{v_p} + \frac{\omega - \omega_0}{v_g} + \frac{\beta''}{2}(\omega - \omega_0)^2 \qquad \text{[Numerical Expression 119]}$$

In Numerical Expression (119), reference symbol $v_p$ denotes a phase velocity, reference numeral $v_g$ denotes a group velocity of light, and a value $\beta''$ has a relationship given by the following Numerical Expression (120) to the D. When the value $\beta''$ is calculated, the D can be calculated:

$$D = -\frac{2\pi c}{\lambda^2} \beta'' \qquad \text{[Numerical Expression 120]}$$

When a total sum of Numerical Expression (118) with respect to $z_i$ is calculated, an amplitude of the Rayleigh scattering is obtained as Numerical Expression (121):

$$\Psi_{total}(t) = \sum_i a(z_i) \cdot \int_{-\infty}^{\infty} A(\omega) \exp\left\{i\left[\begin{array}{c} 2\beta(\omega)z_i - \\ \omega t \end{array}\right]\right\} d\omega \qquad \text{[Numerical Expression 121]}$$

Outputs from the first interference signal detecting means 19 and the second interference signal detecting means 23 are given by the following Numerical Expression (122):

$$I_1 = \langle |\Psi_{total}(t) + \Psi(t)|^2 \rangle$$

$$I_2 = \langle |\Psi_{total}(t) + \Psi(t + d/c)|^2 \rangle \qquad \text{[Numerical Expression 122]}$$

(d expresses length of reference optical path, c expresses velocity of light, and < > expresses time averaging operation.). For this reason, when Numerical Expression (115) and Numerical Expression (121) are assigned to Numerical Expression (122) to neglect a DC component, the following Numerical Expression 123 is given:

[Numerical Expression 123]

$$I_1 = \left\langle \left| \sum_i a(z_i) \cdot \int_{-\infty}^{\infty} A(\omega) \exp\{i[2\beta(\omega)z_i - \omega t]\} d\omega + \int_{-\infty}^{\infty} A(\omega) \exp\{i[k(\omega)z_0 - \omega t]\} d\omega \right|^2 \right\rangle \quad (A)$$

$$= \sum_i a(z_i) \int_{-\infty}^{\infty} S(\omega) \exp\left\{i\left[\begin{array}{c} \frac{\beta''}{2}(\omega - \omega_0)^2 z_i + \\ \frac{\omega - \omega_0}{v_g} z_i + \frac{\omega_0}{v_p} z_i \end{array}\right]\right\} d\omega$$

$$= \sum_i a(z_i) \Gamma(z_i)$$

$$I_2 = \left\langle \left| \sum_i a(z_i) \cdot \int_{-\infty}^{\infty} A(\omega) \exp\{i[2\beta(\omega)z_i - \omega t]\} d\omega + \int_{-\infty}^{\infty} A(\omega) \exp\{i[k(\omega)(z + d) - \omega t]\} d\omega \right|^2 \right\rangle \quad (B)$$

$$= \sum_i a(z_i) \int_{-\infty}^{\infty} S(\omega) \exp\left\{i\left[\begin{array}{c} \frac{\beta''}{2}(\omega - \omega_0)^2 (z_i - d) + \\ \frac{\omega - \omega_0}{v_g}(z_i - d) + \\ \frac{\omega_0}{v_p}(z_i - d) \end{array}\right]\right\} d\omega$$

$$= \sum_i a(z_i) \Gamma(z_i - d)$$

where $$\Gamma(z) = \exp\left[i\frac{\omega_0}{v_p} z\right] \cdot \int_{-\infty}^{\infty} S(\omega) \exp\left\{i\left[\begin{array}{c} \frac{\beta''}{2}(\omega - \omega_0)^2 z - \\ \frac{\omega - \omega_0}{v_g} z \end{array}\right]\right\} d\omega \qquad \begin{bmatrix} \text{Numerical} \\ \text{Expression} \\ 124 \end{bmatrix}$$

In general, $\Gamma(z)$ is called a coherence function of wide-band spectral light. In this case, when it is assumed that $\beta'' z/2$ changes by only quantity which is considerably smaller than $2\pi$ with reference to a change of z which is almost equal to d, $\Gamma(z)$ may be expressed by the following numerical expression:

$$\Gamma(z) \cong \exp\left[i\frac{\omega_0}{v_p} z\right] \cdot \int_{-\infty}^{\infty} S(\omega) \exp\left\{i\left[\begin{array}{c} \frac{\beta'' z_0}{2}(\omega - \omega_0)^2 - \\ \frac{\omega - \omega_0}{v_g} z \end{array}\right]\right\} d\omega \qquad \begin{bmatrix} \text{Numerical} \\ \text{Expression} \\ 125 \end{bmatrix}$$

A real part and an imaginary part of (A) and (B) of Numerical Expression (123) are expressed as $|\Gamma(z)|\alpha_i \cos\theta_i$ and $|\Gamma(z)|\alpha_i \sin\theta_i$. In this case, a vector $(\alpha_i \cos\theta_i, \alpha_i \sin\theta_i)$ represents a random phaser, and $\alpha_i$ represents random variables each expressing a length of the phaser. It is assumed that an average of random variables is given by:

$$\overline{\alpha} \qquad \text{[Numerical Expression 126]}$$

and that a second moment is given by:

$$(\overline{\alpha})^2 \qquad \text{[Numerical Expression 127]}$$

Furthermore, $\theta_i$ represents random variables each expressing a phase of the phaser. The random variables are uniformly distributed within the range of $-\pi$ to $\pi$. The variables $\alpha_i$ and $\theta_i$ are naturally independent of each other. When the expressions of the real part and the imaginary part are used, the following expressions are obtained:

[Numerical Expression 128]

$$|I_1|^2 = \left\{\sum_i |\Gamma(z_i)|\alpha_i\cos\theta_i\right\}^2 + \left\{\sum_i |\Gamma(z_i)|\alpha_i\sin\theta_i\right\}^2 \quad (A)$$

$$= \sum_i \sum_j |\Gamma(z_i)||\Gamma(z_j)|\alpha_i\alpha_j\cos\theta_i\cos\theta_j +$$

$$\sum_i \sum_j |\Gamma(z_i)||\Gamma(z_j)|\alpha_i\alpha_j\sin\theta_i\sin\theta_j$$

$$|I_2|^2 = \left\{\sum_i |\Gamma(z_i-d)|\alpha_i\cos\theta_i\right\}^2 + \left\{\sum_i |\Gamma(z_i-d)|\alpha_i\sin\theta_i\right\}^2 \quad (B)$$

$$= \sum_i \sum_j |\Gamma(z_i-d)||\Gamma(z_j-d)|\alpha_i\alpha_j\cos\theta_i\cos\theta_j +$$

$$\sum_i \sum_j |\Gamma(z_i-d)||\Gamma(z_j-d)|\alpha_i\alpha_j\sin\theta_i\sin\theta_j$$

Therefore, the following expression is obtained:

$$\overline{|I_1|^2|I_2|^2} = \quad \begin{bmatrix}\text{Numerical}\\\text{Expression}\\129\end{bmatrix}$$

$$\sum_i\sum_j\sum_k\sum_n |\Gamma(z_i)||\Gamma(z_j)||\Gamma(z_k-d)||\Gamma(z_n-d)|\overline{\alpha_i\alpha_j\alpha_k\alpha_n}\cdot$$

$$\overline{\cos\theta_i\cos\theta_j\cos\theta_k\cos\theta_n} +$$

$$\sum_i\sum_j\sum_k\sum_n |\Gamma(z_i)||\Gamma(z_j)||\Gamma(z_k-d)||\Gamma(z_n-d)|$$

$$\overline{\alpha_i\alpha_j\alpha_k\alpha_n}\cdot\overline{\cos\theta_i\cos\theta_j\sin\theta_k\sin\theta_n} +$$

$$\sum_i\sum_j\sum_k\sum_n |\Gamma(z_i-d)||\Gamma(z_j-d)||\Gamma(z_k)||\Gamma(z_n)|$$

$$\overline{\alpha_i\alpha_j\alpha_k\alpha_n}\cdot\overline{\cos\theta_i\cos\theta_j\sin\theta_k\sin\theta_n} +$$

$$\sum_i\sum_j\sum_k\sum_n |\Gamma(z_i)||\Gamma(z_j)||\Gamma(z_k-d)||\Gamma(z_n-d)|$$

$$\overline{\alpha_i\alpha_j\alpha_k\alpha_n}\cdot\overline{\sin\theta_i\sin\theta_j\sin\theta_k\sin\theta_n}$$

Since the variables $\theta_i$ are uniformly distributed within the range of $-\pi$ to $\pi$, a term which is not zero in the right-hand side of Numerical Expression (129) appears in only the following case:

1. In case of $i=j=k=n$, $$\overline{\cos\theta_i\cos\theta_j\cos\theta_k\cos\theta_n}=\overline{\cos^4\theta_i}=3/8$$

$$\overline{\cos\theta_i\cos\theta_j\cos\theta_k\cos\theta_n}=\overline{\cos^2\theta_i\sin^2\theta_i}=1/8$$

$$\overline{\sin\theta_i\sin\theta_j\sin\theta_k\sin\theta_n}=\overline{\sin^4\theta_i}=3/8 \quad \text{[Numerical Expression 130]}$$

2. In case of $i=j$ and $k=n$, $$\overline{\cos\theta_i\cos\theta_j\cos\theta_k\cos\theta_n}=\overline{\cos^2\theta_i}\cdot\overline{\cos^2\theta_k}=1/4$$

$$\overline{\cos\theta_i\cos\theta_j\sin\theta_k\sin\theta_n}=\overline{\cos^2\theta_i}\cdot\overline{\sin^2\theta_k}=1/4$$

$$\overline{\sin\theta_i\sin\theta_j\sin\theta_k\sin\theta_n}=\overline{\sin^2\theta_i}\cdot\overline{\sin^2\theta_k}=1/4$$

3. In case of $i=k$ and $j=n$, $$\overline{\cos\theta_i\cos\theta_j\cos\theta_k\cos\theta_n}=\overline{\cos^2\theta_i}\cdot\overline{\cos^2\theta_j}=1/4$$

$$\overline{\cos\theta_i\cos\theta_j\cos\theta_k\cos\theta_n}=\overline{\cos\theta_i\sin\theta_i}\cdot\overline{\cos\theta_j\sin\theta_j}=1/4$$

$$\overline{\sin\theta_i\sin\theta_j\sin\theta_k\sin\theta_n}=\overline{\sin^2\theta_i}\cdot\overline{\sin^2\theta_j}=1/4$$

4. In case of $i=n$, $j=k$, $$\overline{\cos\theta_i\cos\theta_j\cos\theta_k\cos\theta_n}=\overline{\cos^2\theta_i}\cdot\overline{\cos^2\theta_j}=1/4$$

$$\overline{\cos\theta_i\cos\theta_j\sin\theta_k\sin\theta_n}=\overline{\cos\theta_i\sin\theta_i}\cdot\overline{\cos\theta_j\sin\theta_j}=1/4$$

$$\overline{\sin\theta_i\sin\theta_j\sin\theta_k\sin\theta_n}=\overline{\sin^2\theta_i}\cdot\overline{\sin^2\theta_j}=1/4$$

In all other cases except for the above cases, the following expression is obtained:

$$\overline{\cos\theta_i\cos\theta_j\cos\theta_k\cos\theta_n}=0$$

$$\overline{\cos\theta_i\cos\theta_j\sin\theta_k\sin\theta_n}=0$$

$$\overline{\sin\theta_i\sin\theta_j\sin\theta_k\sin\theta_n}=0 \quad \text{[Numerical Expression 131]}$$

Although the case of $i=j$ and $k=n$, the case of $i=k$ and $j=n$, and the case of $i=n$ and $j=k$ appear at a equally probability (N(N−1) times), the case of $i=j=k=n$ appears at a low probability (N times). For this reason, the case can be neglected (becomes zero when $\Sigma$ is replaced with integration). For this reason, Numerical Expression (129) can be expressed as:

$$\overline{|I_1|^2|I_2|^2} = \frac{1}{4}\sum_i\sum_k |\Gamma(z_i)||\Gamma(z_i)||\Gamma(z_k-d)| \quad \begin{bmatrix}\text{Numerical}\\\text{Expression}\\132\end{bmatrix}$$

$$|\Gamma(z_k-d)|\overline{\alpha_i\alpha_i\alpha_k\alpha_k} +$$

$$\frac{1}{4}\sum_i\sum_k |\Gamma(z_i)||\Gamma(z_i)||\Gamma(z_k-d)|$$

$$|\Gamma(z_k-d)|\overline{\alpha_i\alpha_i\alpha_k\alpha_k} +$$

$$\frac{1}{4}\sum_i\sum_k |\Gamma(z_i-d)||\Gamma(z_i-d)||\Gamma(z_k)|$$

$$|\Gamma(z_k)|\overline{\alpha_i\alpha_i\alpha_k\alpha_k} +$$

$$\frac{1}{4}\sum_i\sum_k |\Gamma(z_i)||\Gamma(z_i)||\Gamma(z_k-d)|$$

$$|\Gamma(z_k-d)|\overline{\alpha_i\alpha_i\alpha_k\alpha_k} +$$

$$\frac{1}{4}\sum_i\sum_j |\Gamma(z_i)||\Gamma(z_j)||\Gamma(z_i-d)|$$

$$|\Gamma(z_j-d)|\overline{\alpha_i\alpha_j\alpha_i\alpha_j} +$$

$$\frac{1}{4}\sum_i\sum_j |\Gamma(z_i)||\Gamma(z_j)||\Gamma(z_j-d)|$$

$$|\Gamma(z_j-d)|\overline{\alpha_i\alpha_j\alpha_i\alpha_j} +$$

$$\frac{1}{4}\sum_i\sum_j |\Gamma(z_i)||\Gamma(z_j)||\Gamma(z_i-d)|$$

$$|\Gamma(z_i-d)|\overline{\alpha_i\alpha_j\alpha_j\alpha_i} +$$

$$\frac{1}{4}\sum_i\sum_j |\Gamma(z_i)||\Gamma(z_j)||\Gamma(z_j-d)|$$

$$|\Gamma(z_i-d)|\overline{\alpha_i\alpha_j\alpha_j\alpha_i}$$

-continued $$= \frac{(\overline{\alpha^2})^2}{4} \sum_i \sum_j |\Gamma(z_i)||\Gamma(z_i-d)||\Gamma(z_j-d)| +$$

$$\frac{(\overline{\alpha^2})^2}{4} \sum_i \sum_j |\Gamma(z_i)||\Gamma(z_i)||\Gamma(z_j-d)||\Gamma(z_j-d)| +$$

$$\frac{(\overline{\alpha^2})^2}{4} \sum_i \sum_j |\Gamma(z_i)||\Gamma(z_i)||\Gamma(z_j-d)||\Gamma(z_j-d)| +$$

$$\frac{(\overline{\alpha^2})^2}{4} \sum_i \sum_j |\Gamma(z_i)||\Gamma(z_i)||\Gamma(z_j-d)||\Gamma(z_j-d)| +$$

$$\frac{(\overline{\alpha^2})^2}{4} \sum_i \sum_j |\Gamma(z_i)||\Gamma(z_i-d)||\Gamma(z_j)||\Gamma(z_j-d)| +$$

$$\frac{(\overline{\alpha^2})^2}{4} \sum_i \sum_j |\Gamma(z_i)||\Gamma(z_i-d)||\Gamma(z_j)||\Gamma(z_j-d)| +$$

$$\frac{(\overline{\alpha^2})^2}{4} \sum_i \sum_j |\Gamma(z_i)||\Gamma(z_i-d)||\Gamma(z_j)||\Gamma(z_j-d)| +$$

$$\frac{(\overline{\alpha^2})^2}{4} \sum_i \sum_j |\Gamma(z_i)||\Gamma(z_i-d)||\Gamma(z_j)||\Gamma(z_j-d)|$$

Four terms of the first half of Numerical Expression (132) are equal to each other, and four terms of the second half are equal to each other. Since a delay d in the four terms of the first half acts on only $z_j$, the delay d can be removed without influence. Therefore, the following expression is established:

$$\overline{|I_1|^2|I_2|^2} = (\overline{\alpha^2})^2 \sum_i \sum_j |\Gamma(z_i)||\Gamma(z_i)||\Gamma(z_j)||\Gamma(z_j)| +$$
$$(\overline{\alpha^2})^2 \sum_i \sum_j |\Gamma(z_i)||\Gamma(z_i-d)||\Gamma(z_j)||\Gamma(z_j-d)|$$
[Numerical Expression 133]

From (A) and (B) of Numerical Expression (128), the following Numerical Expression (134) is established:

$$\overline{|I_1|^2} = \sum_i \sum_j |\Gamma(z_i)||\Gamma(z_j)|\overline{\alpha_i\alpha_j\cos\theta_i\cos\theta_j} +$$
$$\sum_i \sum_j |\Gamma(z_i)||\Gamma(z_j)|\overline{\alpha_i\alpha_j\sin\theta_i\sin\theta_j}$$
$$= \overline{\alpha^2} \sum_i |\Gamma(z_i)|^2$$
$$\equiv \overline{|I|^2}$$

[Numerical Expression 134]

$$\overline{|I_2|^2} = \sum_i \sum_j |\Gamma(z_i-d)||\Gamma(z_j-d)|\overline{\alpha_i\alpha_j\cos\theta_i\cos\theta_j} +$$
$$\sum_i \sum_j |\Gamma(z_i-d)||\Gamma(z_j-d)|\overline{\alpha_i\alpha_j\sin\theta_i\sin\theta_j}$$
$$= \overline{\alpha^2} \sum_i |\Gamma(z_i)|^2$$
$$\equiv \overline{|I|^2}$$

Therefore, the following numerical expression is established:

$$\overline{|I_1|^2} = +(\overline{\alpha^2})^2 \sum_i \sum_j |\Gamma(z_i)||\Gamma(z_i)||\Gamma(z_j)||\Gamma(z_j)|$$
[Numerical Expression 135]

Since this is equal to the first term of the right-hand side of Numerical Expression (133), according to Numerical Expression (133), the following numerical expression is obtained:

$$\overline{|I_1|^2|I_2|^2} =$$
$$(\overline{|I|^2})^2 + (\overline{\alpha^2})^2 \sum_i \sum_j |\Gamma(z_i)||\Gamma(z_i-d)||\Gamma(z_j)||\Gamma(z_j-d)|$$
[Numerical Expression 136]

When Σ is replaced with integration, $$\overline{|I_1|^2|I_2|^2} = (\overline{|I|^2})^2 + (\overline{\alpha^2})^2 \int_{-\infty}^{\infty} |\Gamma(z_i)||\Gamma(z_i-d)||\Gamma(z_j)||\Gamma(z_j-d)|dz_idz_j = (\overline{|I|^2})^2 + (\overline{\alpha^2})^2 \{\int_{-\infty}^{\infty} |\Gamma(z)|\cdot|\Gamma(z-d)|dz\}^2$$
[Numerical Expression 137]

is established. In this case, when $$(\overline{\alpha^2})^2$$
[Numerical Expression 138]

is replaced with K, Numerical Expression 137 is equal to (A) of Numerical Expression (112). In this case, Γ is given by:

$$\Gamma(z) \cong \exp\left[i\frac{\omega_0}{v_p}z\right] \cdot \int_{-\infty}^{\infty} S(\omega)\exp\left\{i\left[\frac{\beta''z_0}{2}(\omega-\omega_0)^2 - \frac{\omega-\omega_0}{v_g}z\right]\right\}d\omega$$
[Numerical Expression 139]

However, since all Γ of (A) of Numerical Expression (112) calculate absolute values, contribution of the following numerical expression:

$$\exp\left[i\frac{\omega_0}{v_p}z\right]$$
[Numerical Expression 140]

is eliminated, Numerical Expression 139 may be expressed as Numerical Expression 141:

$$\Gamma(z) =$$
[Numerical Expression 141]

$$\int_{-\infty}^{\infty} S(\omega)\exp\left\{i\left[\frac{\beta''z_0}{2}(\omega-\omega_0)^2 - \frac{\omega-\omega_0}{v_g}z\right]\right\}d\omega$$

Therefore, it was proved that the following Numerical Expression (142) is established:

$$\overline{(|I_1|^2 - \overline{|I|^2})(|I_2|^2 - \overline{|I|^2})} = \overline{|I_1|^2 |I_2|^2} - \overline{|I|^2}$$

[Numerical Expression 142]

$$= K \left\{ \int_{-\infty}^{\infty} |\Gamma(z)| \cdot |\Gamma(z-d)| dz \right\}^2$$

where, $$\Gamma(z) \cong \int_{-\infty}^{\infty} S(\omega) \exp \left\{ i \left[ \frac{\beta'' z_0}{2}(\omega - \omega_0)^2 - \frac{\omega - \omega_0}{v_g} z \right] \right\} d\omega$$

Figure 5:
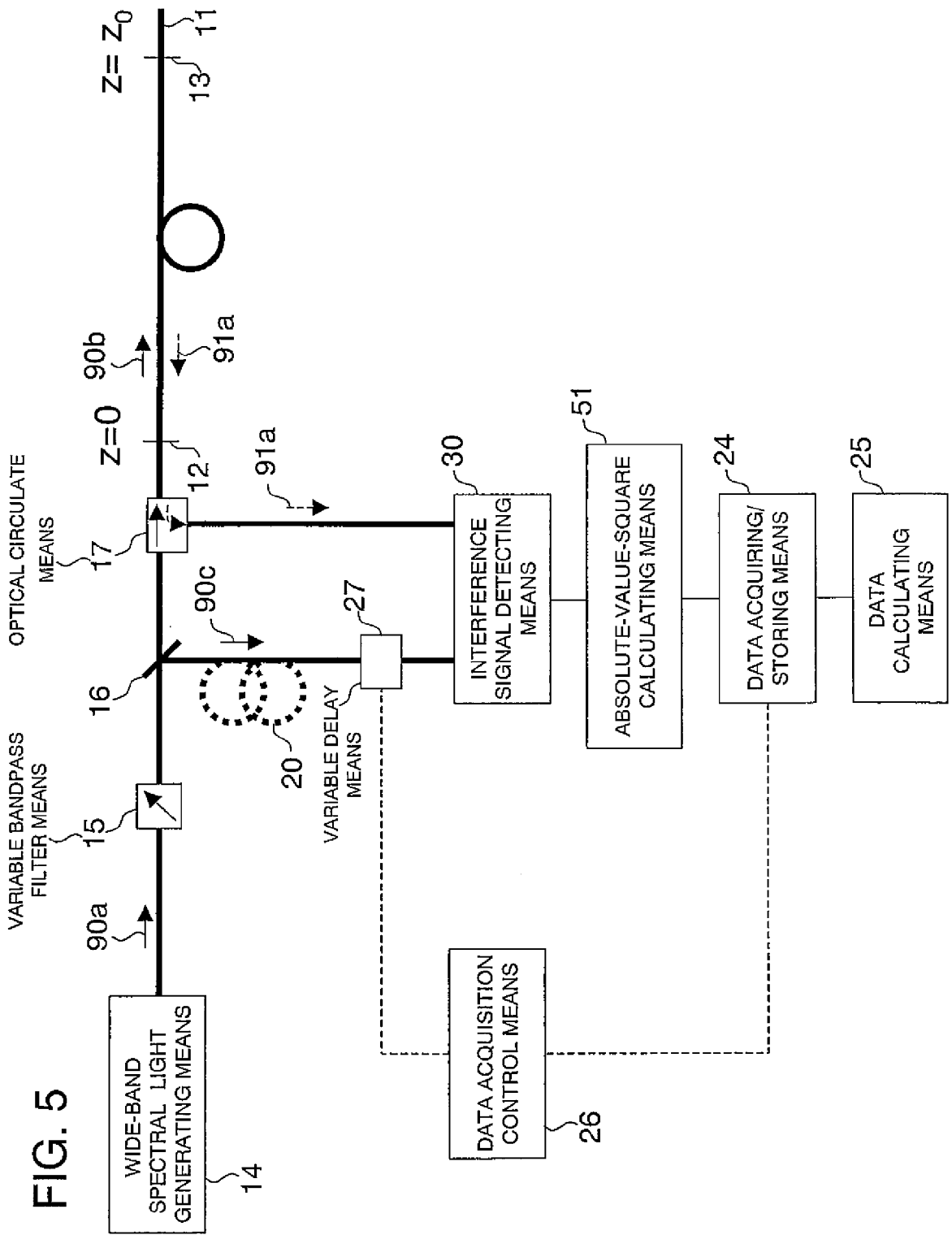
FIG. 5 is an explanatory block diagram showing a wavelength dispersion measuring apparatus for an optical fiber according to Embodiment 2-2 of the present invention.

(Embodiment 2-2) FIG. 5 is an explanatory block diagram showing a wavelength dispersion measuring apparatus for an optical fiber according to Embodiment 2-2 of the present invention. This embodiment will describe a case in which an optical waveguide is a measured optical fiber 11. The optical waveguide is not limited to the measured optical fiber 11, and a slab type or channel type optical waveguide which is used in a planar lightwave circuit and which confines light in a predetermined medium to propagate the light can also be applied. The same reference numerals as in Embodiment 2-1 denote the same parts in Embodiment 2-2.

As shown in FIG. 5, a wavelength dispersion of a section (to be referred as a measuring section hereinafter in the embodiment) extending from an incident end 12 of a measured optical fiber 11 to an arbitrary halfway point 13 is measured. Wide-band spectral light (reference light 90a) having a known spectral density function $S(\omega)$ from a wide-band spectral light generating means 14 is incident on the measured optical fiber 11 through a variable bandpass filter means 15, an optical splitting means 16, and an optical circulate means 17. Rayleigh-scattered light 91a generated at a halfway point of the measured optical fiber 11 by the wide-band spectral light (reference light 90b) being incident on the measured optical fiber 11 is input to an interference signal detecting means 30 serving as a first interference signal detecting means and a second interference signal detecting means through the optical circulate means 17. Wide-band spectral light (reference light 90c) split by the optical splitting means 16 is input to the interference signal detecting means 30 through a delay means 20 having delay time equal to propagation time corresponding to twice a length of a measuring section from the incident end 12 of the measured optical fiber 11 and a variable delay means 27 interlocked with a data acquisition control means 26.

In the interference signal detecting means 30, signals being proportional to Rayleigh-scattered light amplitudes are detected to be input to an absolute-value-square calculating means 51, a data acquiring/storing means 24, and a data calculating means 25. In the absolute-value-square calculating means 51, the data acquiring/storing means 24, and the data calculating means 25, a wavelength dispersion of the section extending from the incident end 12 of the measured optical fiber 11 to the arbitrary halfway point 13 is calculated by a correlational function of signals being proportional to the Rayleigh-scattered light intensities generated at a plurality of halfway points. The variable delay means 27 and the data acquiring/storing means 24 are controlled by the data acquisition control means 26. The data acquisition control means 26 records outputs from the interference signal detecting means 30 as a function of delay time $\tau(=d/c)$ on the data acquiring/storing means 24 while changing quantity of delay of the variable delay means 27. The interference signals detected by the interference signal detecting means 30 are stored by the data acquiring/storing means 24. In the absolute-value-square calculating means 51, a square of an absolute value is calculated from $I(\tau)$ recorded as a function of the delay time $\tau$. In the data calculating means 25, a plurality of numerical values at two arbitrary points time $d/c$ distant from each other are extracted as $|I_1|^2$ and $|I_2|^2$ from $|I(\tau)|^2$ which is a square of the obtained absolute value according to a condition given by the following Numerical Expression (143), and, by using relational expressions ((A), (B), and (C) of Numerical Expression 112) in the Embodiment 2-1, a dispersion of the measured optical fiber 11 in the predetermined section is calculated:

$$|\bar{I}_1|^2 = |I(\tau_i)|^2$$

$$|\bar{I}_2|^2 = \left| I\left(\tau_i + \frac{d}{c}\right) \right|^2$$

[Numerical Expression 143]

The wavelength dispersion measuring method for an optical fiber according to the embodiments is executed by a wavelength dispersion measuring apparatus for an optical fiber including the same functions as those of, more specifically, a computer such as a personal computer on the basis of a predetermined measuring program in advance. The measuring program can be recorded on a recording medium such as a CD which can be read by the wavelength dispersion measuring apparatus for an optical fiber.

More specifically, the measuring program is a measuring program used in a wavelength dispersion measuring apparatus for an optical fiber which can measure a wavelength dispersion of a measuring section of an optical fiber by using a scattering phenomenon in which a scattering coefficient at a local point on the optical fiber is independent of time, and is to cause the wavelength dispersion measuring apparatus for an optical fiber according to the embodiments of the present invention to receive an interference signal $I_1$ being proportional to a scattered light amplitude generated by wide-band spectral light being incident on the optical fiber at a first halfway point and an interference signal $I_2$ being proportional to a scattered light amplitude generated at a second halfway point different from the first halfway point as numerical values and to calculate a correlational function of squares of absolute values of the interference signals $I_1$ and $I_2$, thereby to calculate a wavelength dispersion D in the measuring section by theoretical expressions ((A), (B), and (C) of Numerical Expression 112) in Embodiment 2-1.

In the wavelength dispersion measuring apparatus for an optical fiber according to Embodiment 2-1 of the present invention, when the first interference signal and the second interference signal are represented by $I_1$ and $I_2$, respectively, a correlational function between the first interference signal and the second interference signal detected by the first interference signal detecting means 19 and the second interference signal detecting means 23 is given by the following Numerical Expression (144) expressing an ensemble average of products thereof:

$$\overline{I_1 I_2^*}$$

[Numerical Expression 144]

where ✩ is a complex conjugate sign.

According to the theory, a correlational function between the first interference signal $I_1$ and the second interference signal $I_2$ can be associated with each other by the dispersion D in the measuring section and the following relational expression (Numerical Expression (145)):

[Numerical Expression 145]

$$\frac{\overline{I_1 I_2^*}}{|I_1|^2} = \frac{\overline{I_1 I_2^*}}{|I_2|^2} \quad (A)$$

$$= \frac{\int_{-\infty}^{\infty} |\Gamma(Z)| \Gamma^*(Z-d)\, dZ}{\int_{-\infty}^{\infty} |\Gamma(Z)|^2\, dZ}$$

where, $$\Gamma(z) \cong \exp\left[i\frac{\omega_0}{v_p} z\right] \cdot \quad (B)$$

$$\int_{-\infty}^{\infty} S(\omega) \exp\left\{i\left[\frac{\beta'' z_0}{2}(\omega-\omega_0)^2 - \frac{\omega-\omega_0}{v_g} z\right]\right\} d\omega$$

$$D = -\frac{2\pi c}{\lambda^2} \beta'' \quad (C)$$

The above-mentioned wavelength dispersion measuring method for an optical fiber is also executed by a wavelength dispersion measuring apparatus for an optical fiber including the same functions as those of, more specifically, a computer such as a personal computer on the basis of a predetermined measuring program in advance. The measuring program can be recorded on a recording medium such as a CD which can be read by the wavelength dispersion measuring apparatus for an optical fiber.

More specifically, the measuring program is a measuring program used in a wavelength dispersion measuring apparatus for an optical fiber which can measure a wavelength dispersion of a measuring section of an optical fiber by using a scattering phenomenon in which a scattering coefficient at a local point on the optical waveguide is independent of time, and is to cause the wavelength dispersion measuring apparatus for an optical fiber to receive an interference signal $I_1$ being proportional to a scattered light amplitude generated by wide-band spectral light being incident on the optical fiber at a first halfway point and an interference signal $I_2$ being proportional to a scattered light amplitude generated at a second halfway point different from the first halfway point as numerical values and to calculate a correlational function of the interference signals $I_1$ and $I_2$, thereby to calculate a wavelength dispersion D in the measuring section by (A), (B), and (C) of the above Numerical Expression 145.

The present invention is not directly limited to the above embodiment. In an execution phase, the invention can be embedded by modifying constituent elements within departing from the spirit and scope of the invention. Appropriate combinations of a plurality of constituent elements disclosed in the above embodiment can constitute various inventions. For example, several constituent elements may be omitted from all the constituent elements disclosed in the embodiments. Furthermore, the constituent elements across different embodiments may be appropriately combined to each other.

Embodiment 3

Figure 6:
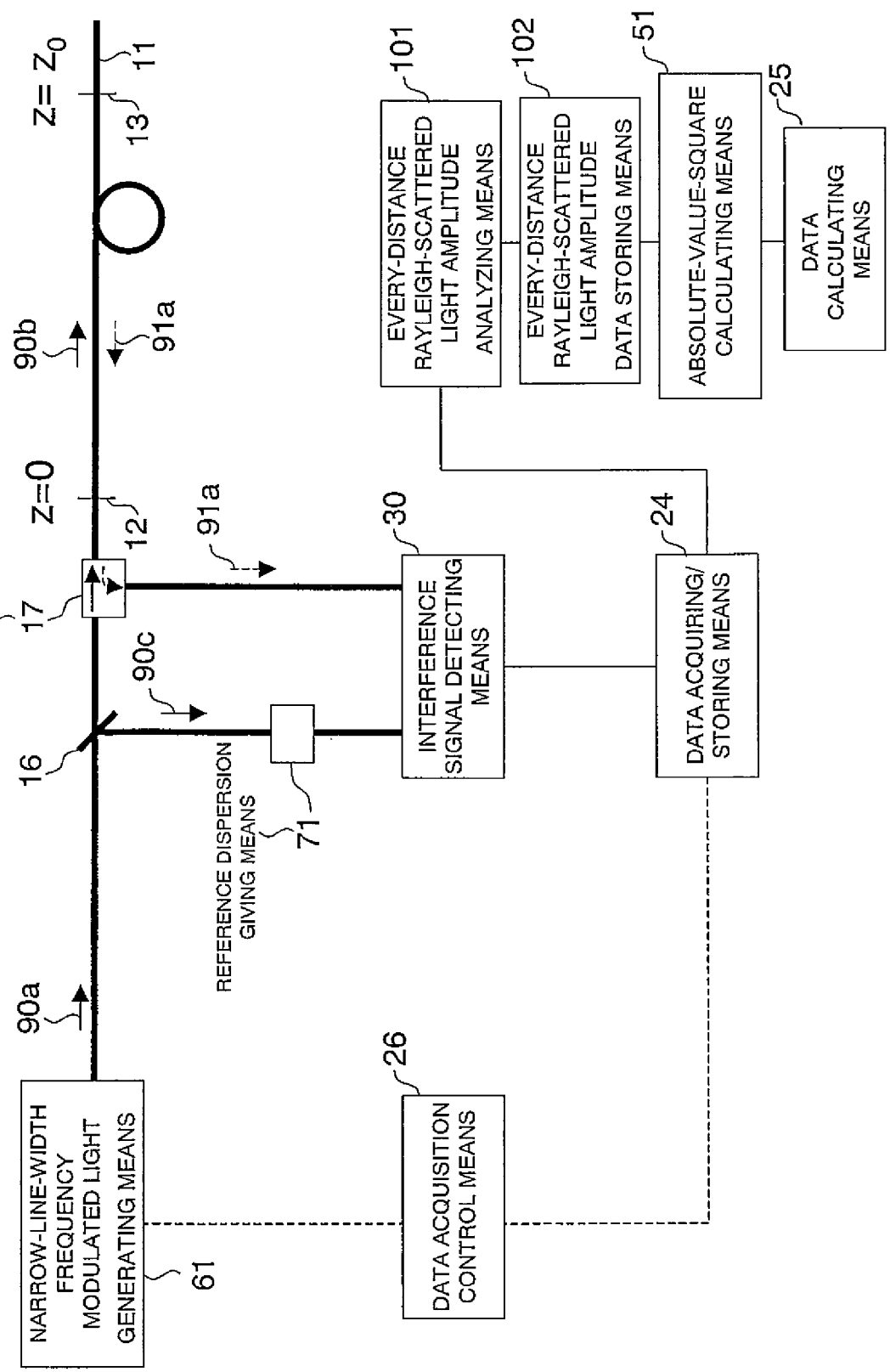
FIG. 6 is an explanatory block diagram showing a wavelength dispersion measuring apparatus for an optical fiber according to Embodiment 3 of the present invention.

FIG. 6 shows a configuration of an embodiment of the present invention. This embodiment will describe a case in which an optical waveguide is a measured optical fiber 11. The optical waveguide is not limited to the measured optical fiber 11, and a slab type or channel type optical waveguide which is used in a planar lightwave circuit and which confines light in a predetermined medium to propagate the light can also be applied. The same reference numerals as in the other embodiments denote the same constituent elements in this embodiment.

In the embodiment, in order to measure Rayleigh-scattered light 91a from an optical fiber, an optical frequency domain reflectometry method (to be referred to as an OFDR method hereinafter) is used. It is a known technique (for example, see Patent Document 1) that an amplitude or an intensity of the Rayleigh-scattered light 91a from the measured optical fiber 11 can be measured as a function of location by the OFDR method.

Patent Document 1: Japanese Patent No. 2907350

In the embodiment, as a means for observing the Rayleigh-scattered light 91a, a low-coherence reflecting method explained in another embodiment can also be used. The measuring means is not limited to a specific means. In the OFDR method, a narrow-line-width laser is used as a light source serving as a narrow-line-width frequency modulated light generating means 61.

Figure 7:
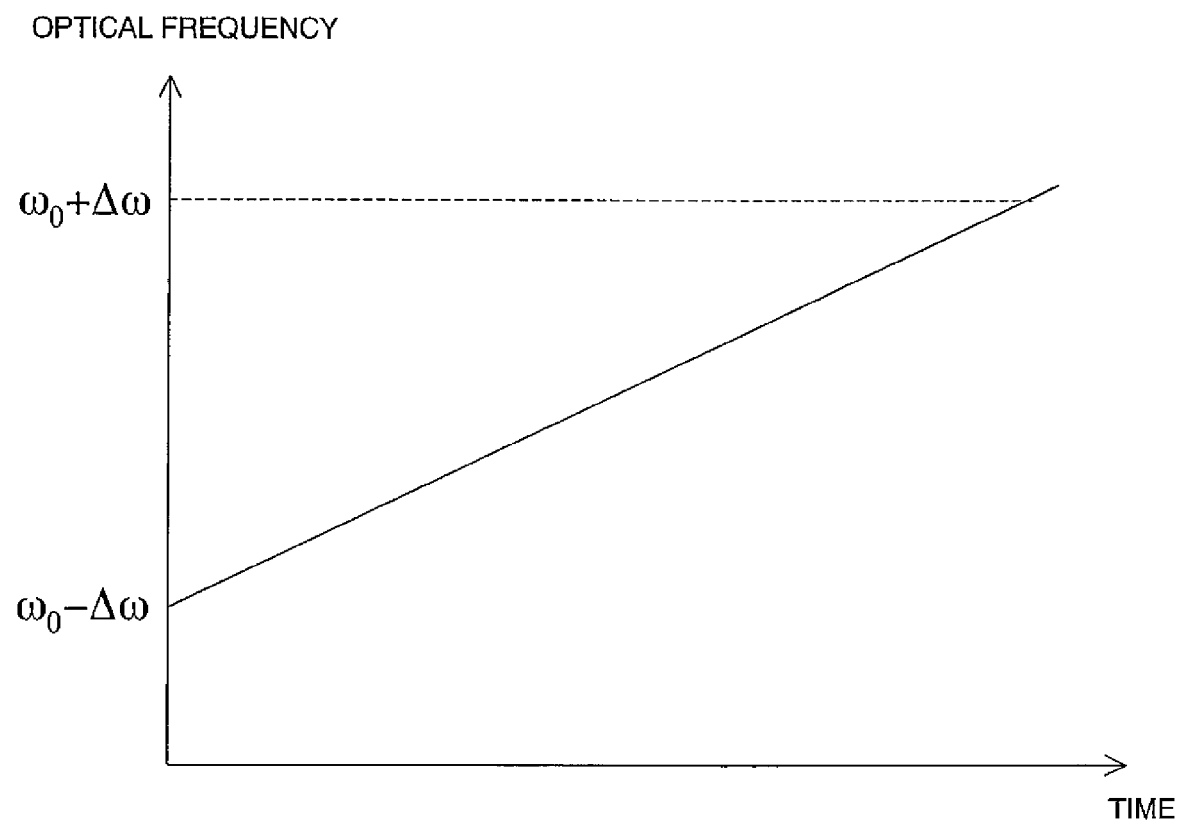
FIG. 7 is a schematic diagram showing a frequency modulated waveform in an OFDR method.
Figure 8:
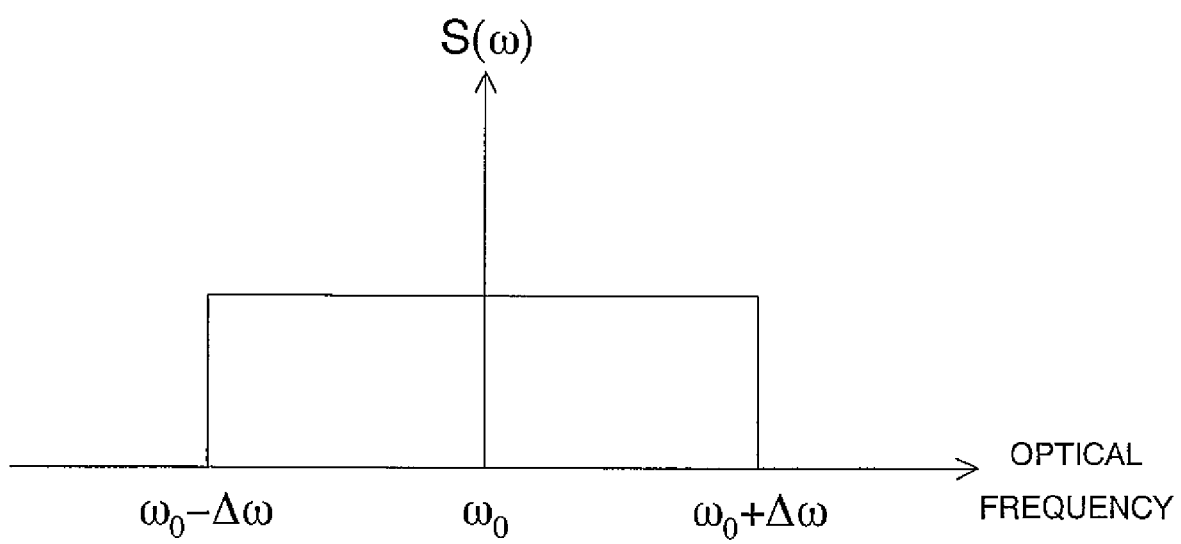
FIG. 8 is a schematic diagram showing a spectral density function in the OFDR method.

In this case, FIG. 7 shows a schematic diagram showing a frequency modulation waveform in the OFDR method, and FIG. 8 shows a schematic diagram showing a spectral density function in the OFDR method.

In the narrow-line-width frequency modulated light generating means 61, the oscillation frequency thereof is linearly changed with respect to time as shown in FIG. 7. A spectral density function $S(\omega)$ at this time has a rectangular shape as shown in FIG. 8.

As shown in FIG. 6, a wavelength dispersion of a section (to be referred to as a measuring section hereinafter in the embodiment) extending from an incident end 12 of the measured optical fiber 11 to a halfway point 13 is measured. Wide-band spectral light (reference light 90a) having a known spectral density function $S(\omega)$ from the narrow-line-width frequency modulated light generating means 61 is incident on the measured optical fiber 11 through an optical splitting means 16, and an optical circulate means 17. Rayleigh-scattered light 91a generated at a halfway point of the measured optical fiber 11 by the wide-band spectral light (reference light 90b) being incident on the measured optical fiber 11 is input to an interference signal detecting means 30 serving as a first interference signal detecting means and a second interference signal detecting means through the optical circulate means 17. Wide-band spectral light (reference light 90c) split by the optical splitting means 16 is input to the interference signal detecting means 30.

In the interference signal detecting means 30, signals being proportional to Rayleigh-scattered light amplitudes are detected to be input to a data acquiring/storing means 24, an every-distance Rayleigh-scattered light amplitude analyzing means 101, an every-distance Rayleigh-scattered light amplitude data storing means 102, a absolute-value-square calculating means 51, and a data calculating means 25. The every-distance Rayleigh-scattered light amplitude analyzing means 101 analyzes the interference signals detected by the interference signal detecting means 30 on the basis of the principle of OFDR to calculate Rayleigh-scattered light amplitudes at the respective points of the measured optical fiber 11 and record the Rayleigh-scattered light amplitudes as functions of delay time from the incident end 12 of the measured optical fiber 11 to the respective points on the every-distance Rayleigh-scattered light amplitude data storing means 102. In the absolute-value-square calculating means 51 and the data calculating means 25, a wavelength dispersion of the section extending from the incident end 12 of the measured optical fiber 11 to the arbitrary halfway point 13 is calculated by a correlational function of signals being proportional to Rayleigh-scattered light intensities generated at a plurality of halfway points. The narrow-line-width frequency modulated light generating means 61 and the data acquiring/storing means 24 are controlled by the data acquisition control means 26. The data acquisition control means 26 records outputs from the interference signal detecting means 30 on the data acquiring/storing means 24 at constant intervals of time while controlling a modulation waveform of the narrow-line-width frequency modulated light generating means 61. The interference signals I detected by the interference signal detecting means 30 are stored by the data acquiring/storing means 24. In the absolute-value-square calculating means 51, a square of an absolute value is calculated from $I(\tau)$ recorded as a function of the delay time $\tau$ from the incident end 12 of the measured optical fiber 11 to respective points. In the data calculating means 25, a plurality of numerical values at two arbitrary points time d/c distant from each other are extracted from $|I(\tau)|^2$ which is a square of the obtained absolute value according to a condition given by the following Numerical Expression (146), and, by using relational expressions ((A), (B), and (C) of Numerical Expression 148), a dispersion of the measured optical fiber 11 in the predetermined section is calculated:

$$|\bar{I}_1|^2 = |I(\tau_i)|^2$$ [Numerical Expression 146]

$$|\bar{I}_2|^2 = \left|I\left(\tau_i + \frac{d}{c}\right)\right|^2$$

The embodiment is characterized in that a reference dispersion giving means 71 in which the following Numerical Expression (147) expressing an accumulated wavelength dispersion is known is inserted on a path of the reference light 90c from the narrow-line-width frequency modulated light generating means 61 to the interference signal detecting means 30 or a path of the Rayleigh-scattered light 91a from the measured optical fiber 11:

$$\beta''_{ref} L_{ref}$$ [Numerical Expression 147]

In the other embodiments described above, an equation which associates a correlational function of scattered light with a wavelength dispersion is an even function to the value of the wavelength dispersion. Therefore, although the absolute value of the wavelength dispersion can be measured, a sign of the wavelength dispersion cannot be known. On the other hand, in the embodiment, it can be shown by the same calculations (Numerical Expressions (115) to (142) in Embodiment 2-1) of another embodiment that a relational expression obtained by inserting the reference dispersion giving means 71 is expressed as the following Numerical Expression (148). The embodiment is different from the other embodiment in only that an accumulated wavelength dispersion is expressed by the above Numerical Expression (147) in $\Gamma(z)$ in Numerical Expressions (115) to (142) in Embodiment 2-1.

[Numerical Expression 148]

$$\overline{(|I_1|^2 - \overline{|I|^2})(|I_2|^2 - \overline{|I|^2})} = \overline{|I_1|^2 |I_2|^2} - \overline{|I|^2}$$ (A)

$$= K\left\{\int_{-\infty}^{\infty} |\Gamma(z)| \cdot |\Gamma(z-d)| dz\right\}^2$$

where, $$\Gamma(z) \cong$$ (B)

$$\int_{-\infty}^{\infty} S(\omega) \exp\left\{i\left[\frac{\beta'' z_0 - \beta''_{ref} L_{ref}}{2}(\omega - \omega_0)^2 - \frac{\omega - \omega_0}{v_g} z\right]\right\} d\omega$$

$$D = -\frac{2\pi c}{\lambda^2} \beta''$$ (C)

$S(\omega)$: spectral density function of known wide-band spectral light
d: relative delay difference
$\omega_0$: central frequency of wide-band spectral light
$v_g$: group velocity of the measured optical fiber 11 (can be calculated from refractive index or the like of the measured optical fiber 11)
$z_0$: length of measuring section extending from the incident end 12 of the measured optical fiber 11
$\lambda$: central wavelength of wide-band spectral light
K: constant
$|I_1|^2$, $|I_2|^2$: squares of absolute values of $I_1$ and $I_2$ $\overline{|I|^2}$:average of $|I_1|^2$ and $|I_2|^2$ [Numerical Expression 149]

Therefore, according to the embodiment, if the wavelength dispersion of the measured optical fiber 11 is zero, a wavelength dispersion corresponding to a value apparently calculated by Numerical Expression (148) is observed. In this manner, according to the embodiment, since a zero point is shifted, a sign of the wavelength dispersion of the measured optical fiber 11 can be detected as an increase or a decrease in absolute value of the apparently measured wavelength dispersion.

The present invention is not directly limited to the example of the above embodiment. In an execution phase, the invention can be embedded by modifying constituent elements within range without departing from the spirit and scope of the invention. Appropriate combinations of a plurality of constituent elements disclosed in the above embodiment can constitute various inventions. For example, several constituent elements may be omitted from all the constituent elements disclosed in the embodiments. Furthermore, the constituent elements across different embodiments may be appropriately combined to each other. In the embodiment, as shown in FIG. 6, a square of an absolute value is calculated from a continuous interference signal I by the interference signal detecting means 30, and a plurality of numerical values at two arbitrary points time d/c distant from each other are extracted as $|I_1|^2$ and $|I_2|^2$ from the square of the absolute value according to a condition given by the following Numerical Expression (146). However, for example, in the configuration in which the narrow-line-width frequency modulated light generating means 61 is applied in place of the wide-band spectral light generating means 14 in FIG. 1 and the reference dispersion giving means 71 in FIG. 6 is inserted between the delay means 20 and the variable delay means 27, the interference signals $I_1$ and $I_2$ may also be independently detected by the first interference signal detecting means 19 and the second interference signal detecting means 23 to give squares of absolute values of the interference signals as $|I_1|^2$ and $|I_2|^2$, respectively.

The invention claimed is:

1. A wavelength dispersion measuring method for an optical waveguide capable of measuring a wavelength dispersion in a section extending from an incident end of the optical waveguide to an arbitrary point along the way by using a scattering phenomenon in which a scattering coefficient at a local point on the optical waveguide is independent of time, comprising:

a step of causing incident light having a known spectral density function $S(\omega)$ to be incident on the optical waveguide; a step of observing, by the incident light being incident on the optical waveguide in the step of causing the incident light to be incident on the optical waveguide, a signal being proportional to a scattered light amplitude generated at a first halfway point included in the section extending from the incident end of the optical waveguide to the arbitrary point along the way and a signal being proportional to a scattered light amplitude generated at a second halfway point being different from the first halfway point and included in the section extending from the incident end of the optical waveguide to the arbitrary point along the way;

a step of calculating by a processor a wavelength dispersion of the section extending from the incident end of the optical waveguide to the arbitrary point along the way by a correlational function between the signal being proportional to the scattered light amplitude at the first halfway point and the signal being proportional to the scattered light amplitude at the second halfway point, the signals being observed in the step of observing the signals which are proportional to the scattered light amplitudes; and a step of using the calculated wavelength dispersion to determine the characteristic of the optical waveguide.

2. The wavelength dispersion measuring method for an optical waveguide according to claim 1, characterized in that the step of observing the signals being proportional to the scattered light amplitudes is the step of observing of Rayleigh-scattered lights as the scattered lights at the first halfway point and the second halfway point.

3. The wavelength dispersion measuring method for an optical waveguide according to claim 1 or 2, characterized in that the step of observing the signals being proportional to the scattered light amplitudes is the step of guiding scattered light generated by incident light being incident on the optical waveguide and incident light passing through delay means having delay time equal to propagation time corresponding to twice a length between the incident end of the optical waveguide and the first halfway point to first interference signal detecting means and second interference signal detecting means which have a relative delay difference equal to a distance between the first halfway point and the second halfway point to detect an interference signal $I_1$ being proportional to a scattered light amplitude from the first halfway point and an interference signal $I_2$ being proportional to a scattered light amplitude from the second halfway point, and the step of calculating the wavelength dispersion is the step of calculating a wavelength dispersion of the section extending from the incident end of the optical waveguide to the arbitrary point along the way by a correlational function between the interference signal $I_1$ and the interference signal $I_2$.

4. The wavelength dispersion measuring method for an optical waveguide according to claim 3, characterized in that variable delay means set on a path of the scattered light or the incident light is arranged, the step of observing the signals being proportional to the scattered light amplitudes is the step of respectively detecting the plurality of interference signals $I_1$ and $I_2$ while causing the variable delay means to change quantity of delay, and the step of calculating the wavelength dispersion is the step of calculating a correlational function between the interference signals $I_1$ and $I_2$ by calculating the following numerical expression (1) expressing an ensemble average of products of the interference signals $I_1$ and $I_2$ detected in the step of observing the signals being proportional to the scattered light amplitudes:

$$\overline{I_1 I_2^*} \qquad \text{[Numerical Expression 1]}.$$

5. The wavelength dispersion measuring method for an optical waveguide according to claim 4, characterized in that by using the following numerical expression (4) calculated as the correlational function of the interference signals $I_1$ and $I_2$:

$$\overline{I_1 I_2^*} \qquad \text{[Numerical Expression 4]}$$

a dispersion D in the section extending from the incident end of the optical waveguide to the arbitrary point along the way is calculated by the following numerical expression (5):

$$\frac{\overline{I_1 I_2^*}}{|I_1|^2} = \frac{\overline{I_1 I_2^*}}{|I_2|^2} \qquad \text{[Numerical Expression 5]}$$

$$= \frac{\int_{-\infty}^{\infty} \Gamma(Z) \Gamma^*(Z-d) dZ}{\int_{-\infty}^{\infty} |\Gamma(Z)|^2 dZ}$$

where, $$\Gamma(z) \cong \exp\left[i\frac{\omega_0}{v_p}z\right] \cdot$$

$$\int_{-\infty}^{\infty} S(\omega) \exp\left\{i\left[\frac{\beta'' z_0}{2}(\omega-\omega_0)^2 - \frac{\omega-\omega_0}{v_g}z\right]\right\} d\omega$$

$$D = -\frac{2\pi c}{\lambda^2}\beta''$$

$S(\omega)$: spectral density function of known incident light d: relative delay difference between first and second interference signal detecting means $\omega_0$: central frequency of incident light $v_g$: group velocity of optical waveguide $z_0$: length of section extending from incident end of the optical waveguide to arbitrary point along the way $\lambda$: central wavelength of incident light $|I_1|^2$, $|I_2|^2$: squares of absolute values of $I_1$ and $I_2$ $\beta$: propagation constant of output fiber.

6. The wavelength dispersion measuring method for an optical waveguide according to claim 3, characterized in that
variable delay means set on a path of the scattered light or the incident light is arranged,
the step of observing the signals being proportional to the scattered light amplitudes is
the step of detecting the interference signals $I_1$ and $I_2$ as interference signals I while causing the variable delay means to continuously change delay time τ, and the step of calculating the wavelength dispersion is the step of recording the interference signals I detected in the step of observing the signals being proportional to the scattered light amplitudes as a function $I(\tau)$ of τ and calculating a correlational function between the interference signal $I_1$ being proportional to a scattered light amplitude from the first halfway point and the interference signal $I_2$ being proportional to a scattered light amplitude from the second halfway point by calculating the following numerical expression (3) expressing an ensemble average of the interference signals $I_1$ and $I_2$:

$$\overline{I_1 I_2^*}$$ [Numerical Expression 3]

by the following numerical expression (2):

$$\overline{I_1 I_2^*} = \langle I(\tau_i) I(\tau_i + d/c) \rangle_i$$ [Numerical Expression 2]

(where $\langle \rangle_i$ expresses an averaging operation about τi) by using the function $I(\tau)$.

7. A wavelength dispersion measuring apparatus for an optical waveguide capable of measuring a wavelength dispersion in a section extending from an incident end of the optical waveguide to an arbitrary point along the way by using a scattering phenomenon in which a scattering coefficient at a local point on the optical waveguide is independent of time, comprising:
means for causing incident light having a known spectral density function $S(\omega)$ to be incident on the optical waveguide; means for observing, by the incident light from the means for causing the incident light on the optical waveguide, a signal being proportional to a scattered light amplitude generated at a first halfway point included in the section extending from the incident end of the optical waveguide to the arbitrary point along the way and a signal being proportional to a scattered light amplitude generated at a second halfway point being different from the first halfway point and included in the section extending from the incident end of the optical waveguide to the arbitrary point along the way; and means for calculating a wavelength dispersion of the section extending from the incident end of the optical waveguide to the arbitrary point along the way by a correlational function between the signal being proportional to the scattered light amplitude at the first halfway point and the signal being proportional to the scattered light amplitude at the second halfway point, the signals being observed by the means for observing the signals which are proportional to the scattered light amplitudes.

8. The wavelength dispersion measuring apparatus for an optical waveguide according to claim 7, characterized in that the means for observing the signals being proportional to the scattered light amplitudes observes Rayleigh-scattered lights as the scattered lights at the first halfway point and the second halfway point.

9. The wavelength dispersion measuring apparatus for an optical waveguide according to claim 7 or 8, characterized in that the means for observing the signals being proportional to the scattered light amplitudes guides scattered light generated by incident light being incident on the optical waveguide and incident light passing through delay means having delay time equal to propagation time corresponding to twice a length between the incident end of the optical waveguide and the first halfway point to first interference signal detecting means and second interference signal detecting means which have a relative delay difference equal to a distance between the first halfway point and the second halfway point to detect an interference signal $I_1$ being proportional to a scattered light amplitude from the first halfway point and an interference signal $I_2$ being proportional to a scattered light amplitude from the second halfway point, and
the means for calculating the wavelength dispersion calculates a wavelength dispersion of the section extending from the incident end of the optical waveguide to the arbitrary point along the way by a correlational function between the interference signal $I_1$ and the interference signal $I_2$ detected by means for observing the signals being proportional to the scattered light amplitudes.

10. The wavelength dispersion measuring apparatus according to claim 9, further comprising variable delay means set on a path of the scattered light or the incident light, and characterized in that
the means for observing the signals being proportional to the scattered light amplitudes respectively detects the plurality of interference signals $I_1$ and $I_2$ while causing the variable delay means to change quantity of delay, and
the means for calculating the wavelength dispersion calculates a correlational function between the interference signals $I_1$ and $I_2$ by calculating the following numerical expression (6) expressing an ensemble average of products of the interference signals $I_1$ and $I_2$ detected by the means for observing the signals being proportional to the scattered light amplitudes:

$$\overline{I_1 I_2^*}$$ [Numerical Expression 6].

11. The wavelength dispersion measuring apparatus according to claim 10, characterized in that, by using the following numerical expression (9) calculated as the correlational function of the interference signals $I_1$ and $I_2$:

$$\overline{I_1 I_2^*}$$ [Numerical Expression 8]

a dispersion D in the section extending from the incident end of the optical waveguide to the arbitrary point along the way is calculated by the following numerical expression (10):

$$\frac{\overline{I_1 I_2^*}}{|I_1|^2} = \frac{\overline{I_1 I_2^*}}{|I_2|^2}$$ [Numerical Expression 10]

$$= \frac{\int_{-\infty}^{\infty} \Gamma(Z) \Gamma^*(Z-d) dZ}{\int_{-\infty}^{\infty} |\Gamma(Z)|^2 dZ}$$

where, $$\Gamma(z) \cong \exp\left[i \frac{\omega_0}{v_p} z\right] \cdot \int_{-\infty}^{\infty} S(\omega) \exp\left\{i \left[\frac{\beta'' z_0}{2}(\omega - \omega_0)^2 - \frac{\omega - \omega_0}{v_g} z\right]\right\} d\omega$$

$$D = -\frac{2\pi c}{\lambda^2} \beta''$$

$S(\omega)$: spectral density function of known incident light
d: relative delay difference between first and second interference signal detecting means
$\omega_0$: central frequency of incident light $v_g$: group velocity of optical waveguide $z_0$: length of section extending from incident end of the optical waveguide to arbitrary point on the way $\lambda$: central wavelength of incident light $|I_1|^2$, $|I_2|^2$: squares of absolute values of $I_1$ and $I_2$ $\beta$: propagation constant of output fiber.

12. The wavelength dispersion measuring apparatus according to claim 9, further comprising variable delay means set on a path of the scattered light or the incident light, and characterized in that the means for observing the signals being proportional to the scattered light amplitudes detects the interference signals $I_1$ and $I_2$ as interference signals I while continuously change delay time $\tau$ of the variable delay means, and the means for calculating the wavelength dispersion records the interference signals I as a function $I(\tau)$ of $\tau$ and calculates a correlational function between the interference signal $I_1$ being proportional to a scattered light amplitude from the first halfway point and the interference signal $I_2$ being proportional to a scattered light amplitude from the second halfway point by calculating the following numerical expression (8) expressing an ensemble average of the interference signals $I_1$ and $I_2$:

$$\overline{I_1 I_2^*} \quad \text{[Numerical Expression 8]}$$

by the following numerical expression (7):

$$\overline{I_1 I_2^*} = \langle I(\tau_i) I(\tau_i + d/c) \rangle \quad \text{[Numerical Expression 7]}$$

(where $\langle \rangle_i$ expresses an averaging operation about $\tau i$) by using the function $I(\tau)$.

13. A wavelength dispersion measuring method for an optical waveguide capable of measuring a wavelength dispersion in a section extending from an incident end of the optical waveguide to an arbitrary point along the way by using a scattering phenomenon in which a scattering coefficient at a local point on the optical waveguide is independent of time, comprising:

a step of causing incident light having a known spectral density function $S(\omega)$ to be incident on the optical waveguide;

a step of observing, by the incident light being incident on the optical waveguide in the step of causing the incident light to be incident on the optical waveguide, a signal being proportional to a scattered light amplitude generated at a first halfway point included in the section extending from the incident end of the optical waveguide to the arbitrary point along the way and a signal being proportional to a scattered light amplitude generated at a second halfway point being different from the first halfway point and included in the section extending from the incident end of the optical waveguide to the arbitrary point along the way;

a step of calculating a wavelength dispersion by a processor of the section extending from the incident end of the optical waveguide to the arbitrary point along the way by square of correlational function between the signal being proportional to the scattered light amplitude at the first halfway point and the signal being proportional to the scattered light amplitude at the second halfway point, the signals being observed in the step of observing the signals which are proportional to the scattered light amplitudes; and a step of using the calculated wavelength dispersion to determine the characteristic of the optical waveguide.

14. The wavelength dispersion measuring method for an optical waveguide according to claim 13, characterized in that the step of observing the signals being proportional to the scattered light amplitudes is the step of guiding scattered light generated by incident light being incident on the optical waveguide and incident light passing through delay means having delay time equal to propagation time corresponding to twice a length between the incident end of the optical waveguide and the first halfway point to first interference signal detecting means and second interference signal detecting means which have a relative delay difference equal to a distance between the first halfway point and the second halfway point to detect an interference signal $I_1$ being proportional to a scattered light amplitude from the first halfway point and an interference signal $I_2$ being proportional to a scattered light amplitude from the second halfway point, and the step of calculating the wavelength dispersion is the step of calculating a wavelength dispersion of the section extending from the incident end of the optical waveguide to the arbitrary point along the way by a correlational function between squares $|I_1|^2$ and $|I_2|^2$ of absolute values of the interference signals $I_1$ and $I_2$.

15. The wavelength dispersion measuring method for an optical waveguide according to claim 14, further comprising variable delay means set on a path of the scattered light or the incident light, and characterized in that the step of observing the signals being proportional to the scattered light amplitudes is the step of detecting the interference signals $I_1$ and $I_2$ as interference signals I while continuously changing delay time $\tau$ of the variable delay means, and the step of calculating the wavelength dispersion is the step of recording the interference signals I as a function $I(\tau)$ of $\tau$ and calculating square of correlational function between the interference signal $I_1$ being proportional to a scattered light amplitude from the first halfway point and the interference signal $I_2$ being proportional to a scattered light amplitude from the second halfway point by using the function $I(\tau)$.

16. The wavelength dispersion measuring method for an optical waveguide according to claim 14 or 15, characterized in that the correlational function of the squares of the absolute values of the interference signals $I_1$ and $I_2$ are calculated to calculate a dispersion D in the section extending from the incident end of the optical waveguide to the arbitrary point along the way by the following numerical expression (11):

$$\frac{\overline{(|I_1|^2 - \overline{|I|^2})}}{(|I_2|^2 - \overline{|I|^2})} = \overline{|I_1|^2 |I_2|^2} - \overline{|I|^2} \quad \text{[Numerical Expression 11]}$$

$$= K \left\{ \int_{-\infty}^{\infty} |\Gamma(z)| \cdot |\Gamma(z-d)| dz \right\}^2$$

where, $$\Gamma(z) \cong \int_{-\infty}^{\infty} S(\omega) \exp \left\{ i \left[ \frac{\beta'' z_0}{2} (\omega - \omega_0)^2 - \frac{\omega - \omega_0}{v_g} z \right] \right\} d\omega$$

$$D = -\frac{2\pi c}{\lambda^2} \beta''$$

S(ω): spectral density function of known incident light
d: relative delay difference between first and second interference signal detecting means
$\omega_0$: central frequency of incident light
$v_g$: group velocity of optical waveguide
$z_0$: length of section extending from incident end of the optical waveguide to arbitrary point along the way
λ: central wavelength of incident light
K: constant
$|I_1|^2$, $|I_2|^2$: squares of absolute values of $I_1$ and $I_2$
β: propagation constant of output fiber $\overline{|I|^2}$: average of $|I_1|^2$ and $|I_2|^2$     [Numerical Expression 12].

17. A wavelength dispersion measuring apparatus for an optical waveguide capable of measuring a wavelength dispersion in a section extending from an incident end of the optical waveguide to an arbitrary point along the way by using a scattering phenomenon in which a scattering coefficient at a local point on the optical waveguide is independent of time, comprising:
   means for causing incident light having a known spectral density function S(ω) to be incident on the optical waveguide;
   means for observing, by the incident light from the means for causing the incident light on the optical waveguide, a signal being proportional to a scattered light amplitude generated at a first halfway point included in the section extending from the incident end of the optical waveguide to the arbitrary point along the way and a signal being proportional to a scattered light amplitude generated at a second halfway point being different from the first halfway point and included in the section extending from the incident end of the optical waveguide to the arbitrary point along the way; and
   means for calculating a wavelength dispersion of the section extending from the incident end of the optical waveguide to the arbitrary point along the way by square of correlational function between the signal being proportional to the scattered light amplitude at the first halfway point and the signal being proportional to the scattered light amplitude at the second halfway point, the signals being observed by the means for observing the signals which are proportional to the scattered light amplitudes.

18. The wavelength dispersion measuring apparatus according to claim 17, characterized in that
   the means for observing the signals being proportional to the scattered light amplitudes guides scattered light generated by incident light being incident on the optical waveguide and incident light passing through delay means having delay time equal to propagation time corresponding to twice a length between the incident end of the optical waveguide and the first halfway point to first interference signal detecting means and second interference signal detecting means which have a relative delay difference equal to a distance between the first halfway point and the second halfway point to detect an interference signal $I_1$ being proportional to a scattered light amplitude from the first halfway point and an interference signal $I_2$ being proportional to a scattered light amplitude from the second halfway point, and
   the means for calculating the wavelength dispersion calculates a wavelength dispersion of the section extending from the incident end of the optical waveguide to the arbitrary point along the way by calculating a correlational function between squares $|I_1|^2$ and $|I_2|^2$ of absolute values of the interference signals $I_1$ and $I_2$ detected by the means for observing the signals being proportional to the scattered light amplitudes.

19. The wavelength dispersion measuring apparatus according to claim 18, further comprising variable delay means set on a path of the scattered light or the incident light, and characterized in that
   the means for observing the signals being proportional to the scattered light amplitudes detects the interference signals $I_1$ and $I_2$ as interference signals I while continuously changing delay time τ of the variable delay means, and
   the means for calculating the wavelength dispersion records the interference signals I as a function I(τ) of τ and calculates square of correlational function between the interference signal $I_1$ being proportional to a scattered light amplitude from the first halfway point and the interference signal $I_2$ being proportional to a scattered light amplitude from the second halfway point by using the function I(τ).

20. The wavelength dispersion measuring apparatus according to claim 18 or 19, characterized in that the means for calculating the wavelength dispersion calculates the correlational function of the squares of the absolute values of the interference signals $I_1$ and $I_2$ to calculate a dispersion D in the section extending from the incident end of the optical waveguide to the arbitrary point along the way by the following numerical expression (13):

[Numerical Expression 13]

$$\frac{\overline{(|I_1|^2 - \overline{|I|^2})}}{\overline{(|I_2|^2 - \overline{|I|^2})}} = \overline{|I_1|^2 |I_2|^2} - \overline{|I|^2}$$

$$= K \left\{ \int_{-\infty}^{\infty} |\Gamma(z)| \cdot |\Gamma(z-d)| dz \right\}^2$$

where, $$\Gamma(z) \cong \int_{-\infty}^{\infty} S(\omega) \exp\left\{ i \left[ \frac{\beta'' z_0}{2}(\omega - \omega_0)^2 - \frac{\omega - \omega_0}{v_g} z \right] \right\} d\omega$$

$$D = -\frac{2\pi c}{\lambda^2} \beta''$$

S(ω): spectral density function of known incident light
d: relative delay difference between first and second interference signal detecting means
$\omega_0$: central frequency of incident light
$v_g$: group velocity of optical waveguide
$z_0$: length of section extending from incident end of the optical waveguide to arbitrary point along the way
λ: central wavelength of incident light
K: constant
$|I_1|^2$, $|I_2|^2$: squares of absolute values of $I_1$ and $I_2$
β: propagation constant of output fiber $\overline{|I|^2}$: average of $|I_1|^2$ and $|I_2|^2$     [Numerical Expression 14].

21. A non-transitory computer readable medium storing a measuring program used in a wavelength dispersion measuring apparatus for an optical waveguide capable of measuring a wavelength dispersion in a section extending from an incident end of the optical waveguide to an arbitrary point along the way by using a scattering phenomenon in which a scattering coefficient at a local point on the optical waveguide is independent of time, wherein the wavelength dispersion measuring apparatus for an optical waveguide according to claim 20 is caused to receive an interference signal $I_1$ being proportional to a scattered light amplitude generated by incident light being incident on the optical waveguide at a first halfway point included in the section extending from the incident end of the optical waveguide to the arbitrary point along the way and an interference signal $I_2$ being proportional to a scattered light amplitude generated by the incident light being incident on the optical waveguide at a second halfway point different from the first halfway point and included in the section extending from the incident end of the optical waveguide to the arbitrary point along the way as numerical values and calculate the correlational function of the squares of the absolute values of the interference signals $I_1$ and I2, thereby to calculate a wavelength dispersion D in the section extending from the incident end of the optical waveguide to the arbitrary point along the way by the following numerical expression (15):

$$\overline{(|I_1|^2 - \overline{|I|^2})} = \overline{|I_1|^2 |I_2|^2} - \overline{|I|^2}$$
$$\overline{(|I_2|^2 - \overline{|I|^2})}$$

[Numerical Expression 15]

$$= K \left\{ \int_{-\infty}^{\infty} |\Gamma(z)| \cdot |\Gamma(z-d)| dz \right\}^2$$

where, $$\Gamma(z) \cong \int_{-\infty}^{\infty} S(\omega) \exp\left\{ i \left[ \frac{\beta'' z_0}{2}(\omega - \omega_0)^2 - \frac{\omega - \omega_0}{v_g} z \right] \right\} d\omega$$

$$D = -\frac{2\pi c}{\lambda^2} \beta''$$

$S(\omega)$: spectral density function of known incident light
d: relative delay difference between first and second interference signal detecting means
$\omega_0$: central frequency of incident light
$v_g$: group velocity of optical waveguide
$z_0$: length of section extending from incident end of the optical waveguide to arbitrary point along the way
$\lambda$: central wavelength of incident light
K: constant
$|I_1|^2$, $|I_2|^2$ squares of absolute values of $I_1$ and $I_2$
$\beta$: propagation constant of output fiber $\overline{|I|^2}$: average of $|I_1|^2$ and $|I_2|^2$   [Numerical Expression 16].

22. A non-transitory computer readable medium storing a measuring program used in a wavelength dispersion measuring apparatus for an optical waveguide capable of measuring a wavelength dispersion in a section extending from an incident end of the optical waveguide to an arbitrary point along the way by using a scattering phenomenon in which a scattering coefficient at a local point on the optical waveguide is independent of time, wherein the wavelength dispersion measuring apparatus for an optical waveguide is caused to receive an interference signal $I_1$ being proportional to a scattered light amplitude generated by incident light being incident on the optical waveguide at a first halfway point included in the section extending from the incident end of the optical waveguide to the arbitrary point along the way and an interference signal $I_2$ being proportional to a scattered light amplitude generated by the incident light being incident on the optical waveguide at a second halfway point different from the first halfway point and included in the section extending from the incident end of the optical waveguide to the arbitrary point along the way as numerical values and calculate the correlational function of the interference signals $I_1$ and $I_2$, thereby to calculate a wavelength dispersion D in the section extending from the incident end of the optical waveguide to the arbitrary point along the way by the following numerical expression (17):

$$\frac{\overline{I_1 I_2^*}}{\overline{|I_1|^2}} = \frac{\overline{I_1 I_2^*}}{\overline{|I_2|^2}}$$

[Numerical Expression 17]

$$= \frac{\int_{-\infty}^{\infty} \Gamma(Z)\Gamma^*(Z-d)dZ}{\int_{-\infty}^{\infty} |\Gamma(Z)|^2 dZ}$$

where, $$\Gamma(z) \cong \exp\left[i\frac{\omega_0}{v_p}z\right] \cdot \int_{-\infty}^{\infty} S(\omega) \exp\left\{i\left[\frac{\beta'' z_0}{2}(\omega - \omega_0)^2 - \frac{\omega - \omega_0}{v_g} z\right]\right\} d\omega$$

$$D = -\frac{2\pi c}{\lambda^2} \beta''$$

$S(\omega)$: spectral density function of known incident light
d: relative delay difference between first and second interference signal detecting means
$\omega_0$: central frequency of incident light
$v_g$: group velocity of optical waveguide
$z_0$: length of section extending from incident end of the optical waveguide to arbitrary point along the way
$\lambda$: central wavelength of incident light
K: constant
$|I_1|^2$, $|I_2|^2$ squares of absolute values of $I_1$ and $I_2$
$\beta$: propagation constant of output fiber.

23. A method capable of measuring a wavelength dispersion of a section extending from an incident end of an optical waveguide to an arbitrary point along the way by using a scattering phenomenon in which a scattering coefficient at a local point on the optical waveguide is independent of time, comprising:

a step of causing incident light having a known spectral density function $S(\omega)$ to be incident on the optical waveguide;

a step of observing, by the incident light being incident on the optical waveguide in the step of causing the incident light to be incident on the optical waveguide, a signal being proportional to a scattered light amplitude generated at a first halfway point included in the section extending from the incident end of the optical waveguide to the arbitrary point along the way and a signal being proportional to a scattered light amplitude generated at a second halfway point being different from the first halfway point and included in the section extending from the incident end of the optical waveguide to the arbitrary point along the way; and a step of calculating by a processor a wavelength dispersion of the section extending from the incident end of the optical waveguide to the arbitrary point along the way by square of correlational function between the signal being proportional to the scattered light amplitude at the first halfway point and the signal being proportional to the scattered light amplitude at the second halfway point, the signals being observed in the step of observing the signals which are proportional to the scattered light amplitudes, and characterized in that the step of observing the signals being proportional to the scattered light amplitudes is the step of, when scattered light generated by incident light being incident on the optical waveguide and incident light passing through delay means having delay time equal to propagation time corresponding to twice a length between the incident end of the optical waveguide and the first halfway point are guided to first interference signal detecting means and second interference signal detecting means which have a relative delay difference equal to a distance between the first halfway point and the second halfway point to detect an interference signal $I_1$ being proportional to a scattered light amplitude from the first halfway point and an nterference signal $I_2$ being proportional to a scattered light amplitude from the second halfway point, detecting the interference signals $I_1$ and $I_2$ through a dispersion medium which is inserted on a path on which the scattered lights from the first halfway point and the second halfway point are guided to the first interference signal detecting means and the second interference signal detecting means or a path on which the incident light is guided to the first interference signal detecting means and the second interference signal detecting means in advance and in which a value of the following numerical expression (18):

$$\beta_{ref}''L_{ref} \qquad \text{[Numerical Expression 18]}$$

expressing an accumulated wavelength dispersion is known, and the step of calculating the wavelength dispersion is the step of calculating a correlational function between squares of absolute values of the interference signals $I_1$ and $I_2$ to calculate a dispersion D in the section extending from the incident end of the optical waveguides to the arbitrary point along the way by the following Numerical Expression (19):

$$\frac{\overline{(|I_1|^2 - \overline{|I|^2})}}{\overline{(|I_2|^2 - \overline{|I|^2})}} = \overline{|I_1|^2|I_2|^2} - \overline{|I|^2} \qquad \text{[Numerical Expression 19]}$$

$$= K \left\{ \int_{-\infty}^{\infty} |\Gamma(z)| \cdot |\Gamma(z-d)| dz \right\}^2$$

where, $$\Gamma(z) \cong \int_{-\infty}^{\infty} S(\omega) \exp\left\{ i \left[ \frac{(\beta''z_0 - \beta_{ref}''L_{ref})}{2}(\omega - \omega_0)^2 - \frac{\omega - \omega_0}{v_g} z \right] \right\} d\omega$$

$$D = -\frac{2\pi c}{\lambda^2} \beta''$$

$S(\omega)$: spectral density function of known incident light
d: relative delay difference between first and second interference signal detecting means
$\omega_0$: central frequency of incident light
$v_g$: group velocity of optical waveguide
$z_0$: length of section extending from incident end of the optical waveguide to arbitrary point along the way
$\lambda$: central wavelength of incident light
K: constant
$|I_1|^2$, $|I_2|^2$ squares of absolute values of $I_1$ and $I_2$ $\beta$: propagation constant of output fiber $\overline{|I|^2}$: average of $|I_1|^2$ and $|I_2|^2$ [Numerical Expression 20]

a step of using the calculated wavelength dispersion to determine the characteristic of the optical waveguide.

24. A wavelength dispersion measuring apparatus for an optical waveguide capable of measuring a wavelength dispersion of a section extending from an incident end of the optical waveguide to an arbitrary point along the way by using a scattering phenomenon in which a scattering coefficient at a local point on the optical waveguide is independent of time, comprising:

means for causing incident light having a known spectral density function $S(\omega)$ to be incident on the optical waveguide;

means for observing, by the incident light from the means for causing the incident light to be incident on the optical waveguide, a signal being proportional to a scattered light amplitude generated at a first halfway point included in the section extending from the incident end of the optical waveguide to the arbitrary point along the way and a signal being proportional to a scattered light amplitude generated at a second halfway point being different from the first halfway point and included in the section extending from the incident end of the optical waveguide to the arbitrary point along the way; and means for calculating a wavelength dispersion of the section extending from the incident end of the optical waveguide to the arbitrary point along the way by square of correlational function between the signal being proportional to the scattered light amplitude at the first halfway point and the signal being proportional to the scattered light amplitude at the second halfway point, the signals being observed in the means of observing the signals which are proportional to the scattered light amplitudes, and characterized in that the means for observing the signals being proportional to the scattered light amplitudes detects, when scattered light generated by incident light being incident on the optical waveguide and incident light passing through delay means having delay time equal to propagation time corresponding to twice a length between the incident end of the optical waveguide and the first halfway point are guided to first interference signal detecting means and second interference signal detecting means which have a relative delay difference equal to a distance between the first halfway point and the second halfway point to detect an interference signal $I_1$ being proportional to a scattered light amplitude from the first halfway point and an interference signal I2 being proportional to a scattered light amplitude from the second halfway point, the interference signals $I_1$ and $I_2$ through a dispersion medium which is inserted on a path on which the scattered lights from the first halfway point and the second halfway point are guided to the first interference signal detecting means and the second interference signal detecting means or a path on which the incident light is guided to the first interference signal detecting means and the second interference signal detecting means in advance and in which a value of the following Numerical Expression (21):

$$\beta_{ref}''L_{ref} \qquad \text{[Numerical Expression 21]}$$

expressing an accumulated wavelength dispersion is known, and the means for calculating the wavelength dispersion calculates a correlational function between squares of absolute values of the interference signals $I_1$ and $I_2$ to calculate a dispersion D in the section extending from the incident end of the optical waveguides to the arbitrary point along the way by the following Numerical Expression (22):

$$\frac{\overline{(|I_1|^2 - \overline{|I|^2})}}{\overline{(|I_2|^2 - \overline{|I|^2})}} = \overline{|I_1|^2|I_2|^2} - \overline{|I|^2}$$

$$= K\left\{\int_{-\infty}^{\infty} |\Gamma(z)| \cdot |\Gamma(z-d)| dz\right\}^2$$

[Numerical Expression 22]

where, $$\Gamma(z) \cong \int_{-\infty}^{\infty} S(\omega)\exp\left\{i\left[\frac{(\beta'' z_0 - \beta''_{ref} L_{ref})}{2}(\omega - \omega_0)^2 - \frac{\omega - \omega_0}{v_g}z\right]\right\}d\omega$$

$$D = -\frac{2\pi c}{\lambda^2}\beta''$$

$S(\omega)$: spectral density function of known incident light d: relative delay difference between first and second interference signal detecting means $\omega_0$: central frequency of incident light $v_g$: group velocity of optical waveguide $z_0$: length of section extending from incident end of the optical waveguide to arbitrary point along the way $\lambda$: central wavelength of incident light K: constant $|I_1|^2$, $|I_2|^2$ squares of absolute values of $I_1$ and $I_2$ $\beta$: propagation constant of output fiber $\overline{|I|^2}$: average of $|I_1|^2$ and $|I_2|^2$ [Numerical Expression 23].

\* \* \* \* \*